US012691742B2

(12) United States Patent
Kalarasaiah et al.

(10) Patent No.: US 12,691,742 B2
(45) Date of Patent: Jul. 28, 2026

(54) MOUNTING ASSEMBLY ATTACHING POWER SUPPLY TO VEHICLE

(71) Applicant: Daimler Truck North America LLC, Portland, OR (US)

(72) Inventors: Rajashekar Kalarasaiah, Karnataka (IN); Trevor Takaro, Battle Ground, WA (US)

(73) Assignee: Daimler Truck North America LLC, Portland, OR (US)

( * ) Notice: Subject to any disclaimer, the term of this patent is extended or adjusted under 35 U.S.C. 154(b) by 629 days.

(21) Appl. No.: 18/298,866

(22) Filed: Apr. 11, 2023

(65) Prior Publication Data

US 2023/0322069 A1 Oct. 12, 2023

Related U.S. Application Data

(60) Provisional application No. 63/330,175, filed on Apr. 12, 2022, provisional application No. 63/330,171, filed on Apr. 12, 2022.

(51) Int. Cl.
B60K 1/04 (2019.01)
B60R 16/04 (2006.01)
(Continued)

(52) U.S. Cl.
CPC .............. B60K 1/04 (2013.01); B60R 16/04 (2013.01); B62D 21/157 (2013.01); F16F 15/04 (2013.01); B60K 2001/0405 (2013.01)

(58) Field of Classification Search
CPC .............. B60K 1/04; B60K 2001/0438; B60K 2001/0405; B60L 53/80; B60L 50/66; H01M 50/249
See application file for complete search history.

(56) References Cited

U.S. PATENT DOCUMENTS 6,668,957 B2 * 12/2003 King ...................... B60R 16/04
180/68.5
9,409,495 B2 * 8/2016 Kobayashi .............. B60R 16/04
(Continued)

FOREIGN PATENT DOCUMENTS

CN 113302075 A * 8/2021 .............. B60L 50/64
DE 102019005927 A1 * 2/2020 ............. B62D 21/00
(Continued)

OTHER PUBLICATIONS

International Search Report and Written Opinion received for PCT Patent Application No. PCT/US2023/018342, mailed on Jul. 18, 2023, 10 pages.
(Continued)

*Primary Examiner* — Katy M Ebner
(74) *Attorney, Agent, or Firm* — ArentFox Schiff LLP

(57) ABSTRACT

This disclosure relates to mounting a power supply module to a vehicle. In particular, a mounting assembly attaches the power supply module at least partially beneath the chassis of the vehicle. The mounting assembly can comprise one or more mounting brackets that are coupled to the power supply module and that attach (directly or indirectly) to the chassis rail. For instance, a mounting bracket can comprise one or more flanges that attach beneath an overhang of the power supply module, and as such, a load path can pass at least partially through the bracket. In addition, the mounting assembly can include one or more rail-mount brackets that attach to a chassis rail and that are configured to attach to the one or more mounting brackets.

24 Claims, 14 Drawing Sheets

(51) Int. Cl.
    *B62D 21/15*       (2006.01)
    *F16F 15/04*       (2006.01)

(56)           References Cited

U.S. PATENT DOCUMENTS

| | | | | |
|---|---|---|---|---|
| 10,493,837 | B1 * | 12/2019 | Angelo | B60L 50/66 |
| 11,040,610 | B2 * | 6/2021 | Sloan | B60L 50/66 |
| 11,124,076 | B1 * | 9/2021 | Borghi | B62D 21/02 |
| 11,932,098 | B2 * | 3/2024 | Hendriks | B60L 50/66 |
| 11,938,804 | B2 * | 3/2024 | Andersson | H01M 50/249 |
| 12,194,830 | B2 * | 1/2025 | Andersson | H01M 50/249 |
| 12,220,979 | B2 * | 2/2025 | Okonogi | H01M 50/204 |
| 12,370,876 | B1 * | 7/2025 | Kosbau | B60L 50/66 |
| 12,391,131 | B2 * | 8/2025 | Kumagai | B60L 50/66 |
| 12,403,794 | B2 * | 9/2025 | Mak | B60L 58/26 |
| 2006/0096794 | A1 * | 5/2006 | Yoshida | B60L 50/66 |
| | | | | 180/68.5 |
| 2020/0317083 | A1 * | 10/2020 | Messina | B60P 3/16 |
| 2021/0155224 | A1 * | 5/2021 | McKibben | B60L 1/02 |
| 2021/0179176 | A1 * | 6/2021 | Kim | B60K 1/04 |
| 2021/0188069 | A1 * | 6/2021 | Friedman | B62D 27/06 |
| 2021/0284005 | A1 * | 9/2021 | Yun | G08B 17/00 |
| 2021/0362579 | A1 * | 11/2021 | Kumagai | H01M 50/262 |
| 2021/0387519 | A1 * | 12/2021 | Landvik | H01M 50/244 |
| 2021/0387534 | A1 * | 12/2021 | Sjöholm | B62D 27/02 |
| 2022/0097537 | A1 * | 3/2022 | Prothery | B60L 50/66 |
| 2022/0111716 | A1 * | 4/2022 | Mckibben | B60L 50/62 |
| 2022/0111717 | A1 * | 4/2022 | Hendriks | B60L 50/66 |
| 2022/0126706 | A1 * | 4/2022 | Ragot | B60L 50/66 |
| 2022/0169104 | A1 * | 6/2022 | Andersson | B60K 1/04 |
| 2022/0169125 | A1 * | 6/2022 | Borghi | B60L 3/0046 |
| 2022/0388385 | A1 * | 12/2022 | Okonogi | H01M 50/249 |
| 2022/0410686 | A1 * | 12/2022 | Kumagai | B62D 21/09 |
| 2023/0015644 | A1 * | 1/2023 | Hörder | B60L 50/66 |
| 2023/0158880 | A1 * | 5/2023 | Ragot | B60L 50/66 |
| | | | | 180/68.5 |
| 2023/0173904 | A1 * | 6/2023 | Ragot | H01M 50/244 |
| | | | | 180/68.5 |
| 2023/0202282 | A1 * | 6/2023 | Ragot | B60L 50/66 |
| | | | | 180/68.5 |
| 2023/0322069 | A1 * | 10/2023 | Kalarasaiah | F16F 15/04 |
| | | | | 180/68.5 |
| 2024/0258628 | A1 * | 8/2024 | Milanovic | H01M 50/209 |
| 2024/0286480 | A1 * | 8/2024 | Kumagai | B62D 21/09 |
| 2025/0042235 | A1 * | 2/2025 | Rori | B62D 21/03 |
| 2025/0083752 | A1 * | 3/2025 | Fujino | B62D 25/2036 |
| 2025/0141012 | A1 * | 5/2025 | Wang | H01M 50/209 |
| 2025/0153555 | A1 * | 5/2025 | Little | B60L 50/66 |
| 2025/0289301 | A1 * | 9/2025 | Green | H01M 50/249 |
| 2025/0316821 | A1 * | 10/2025 | Landvik | H01M 50/258 |
| 2025/0332902 | A1 * | 10/2025 | Sekiuchi | H01M 50/242 |

FOREIGN PATENT DOCUMENTS

| | | | | |
|---|---|---|---|---|
| DE | 102020000491 | A1 * | 9/2020 | B60K 1/04 |
| DE | 102020004795 | A1 * | 11/2020 | B60K 1/04 |
| EP | 3 925 808 | A1 | 12/2021 | |
| WO | 2021/223846 | A1 | 11/2021 | |

OTHER PUBLICATIONS

International Preliminary Report on Patentability received for PCT Patent Application No. PCT/US2023/018342, mailed on Oct. 24, 2024, 7 pages.

\* cited by examiner

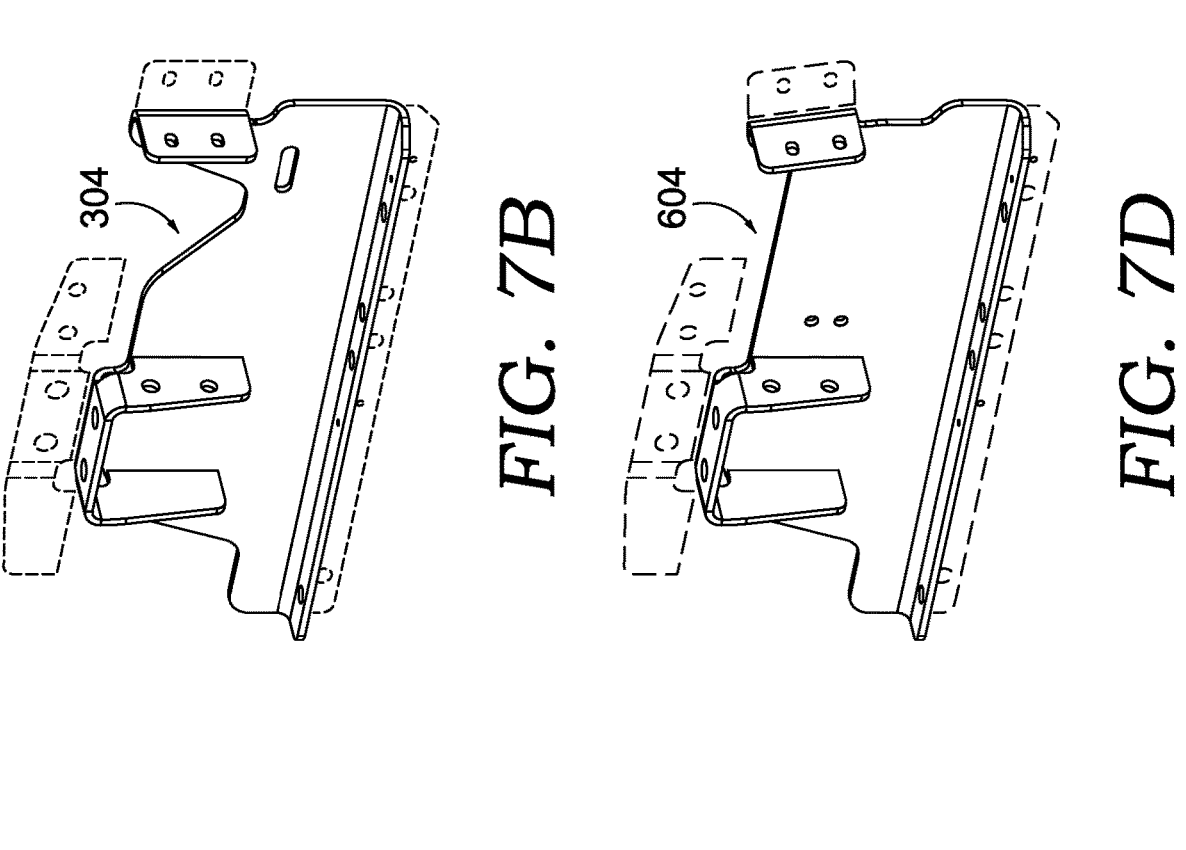
*FIG. 7B*
*FIG. 7D*
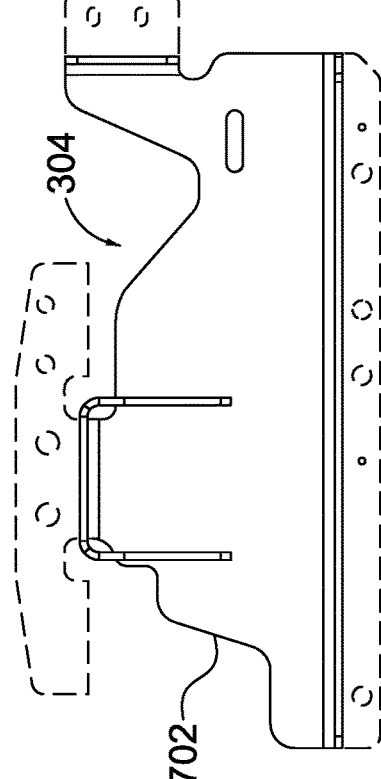
*FIG. 7A*
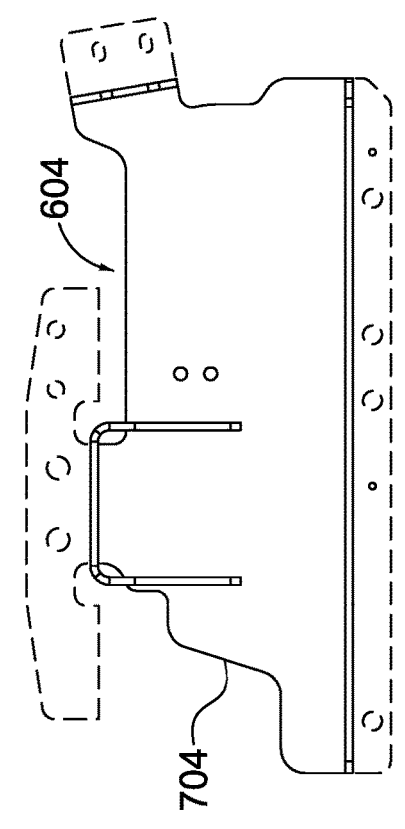
*FIG. 7C*

Enlarged view with bracket 804 disassembled from rail 102

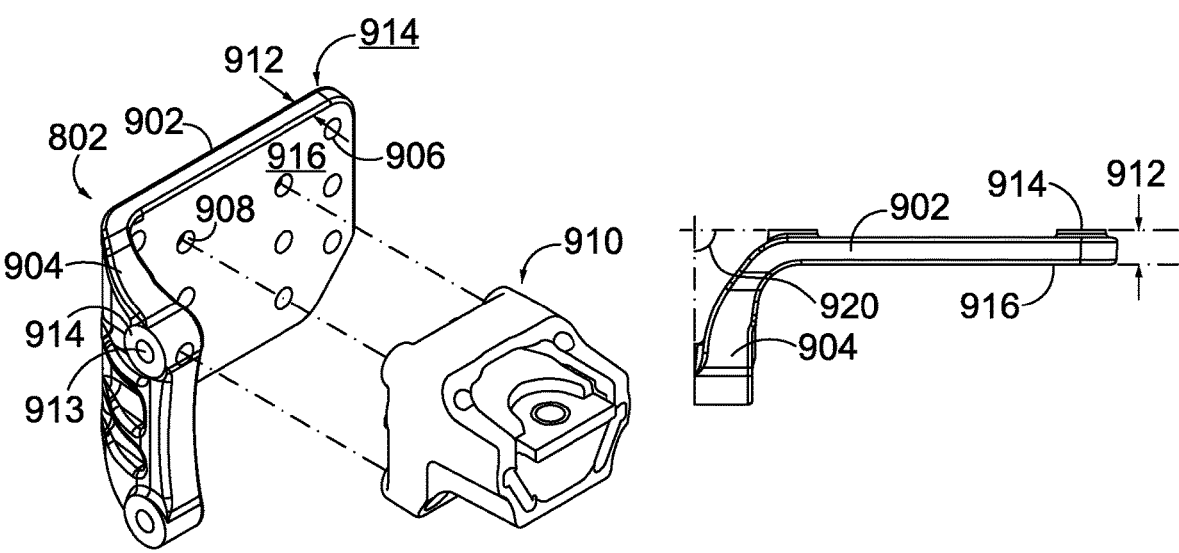
*FIG. 9A*       *FIG. 9B*
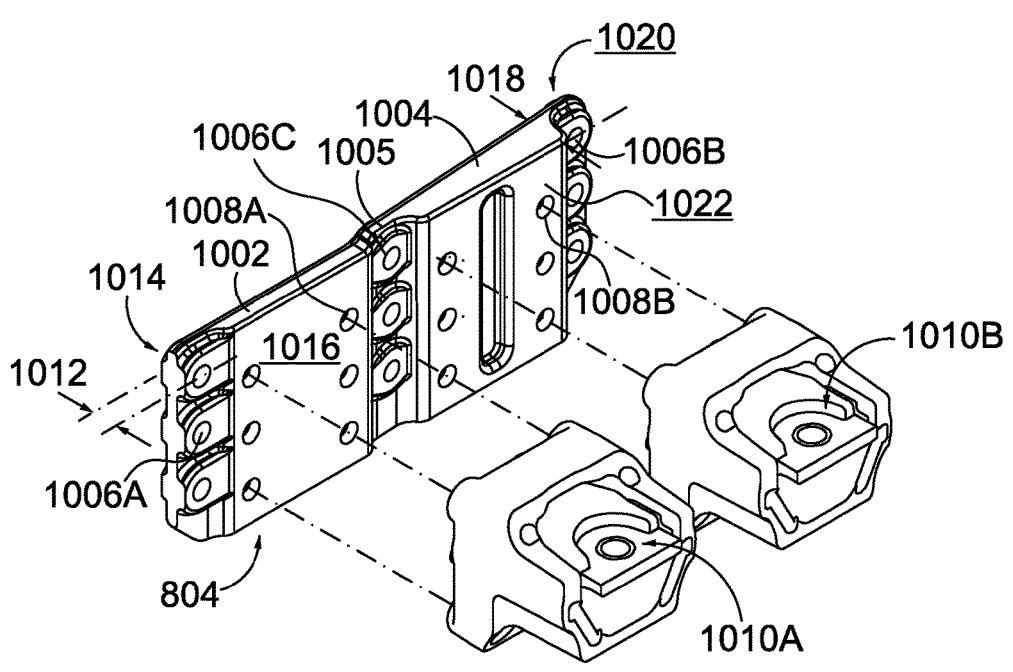
*FIG. 10*

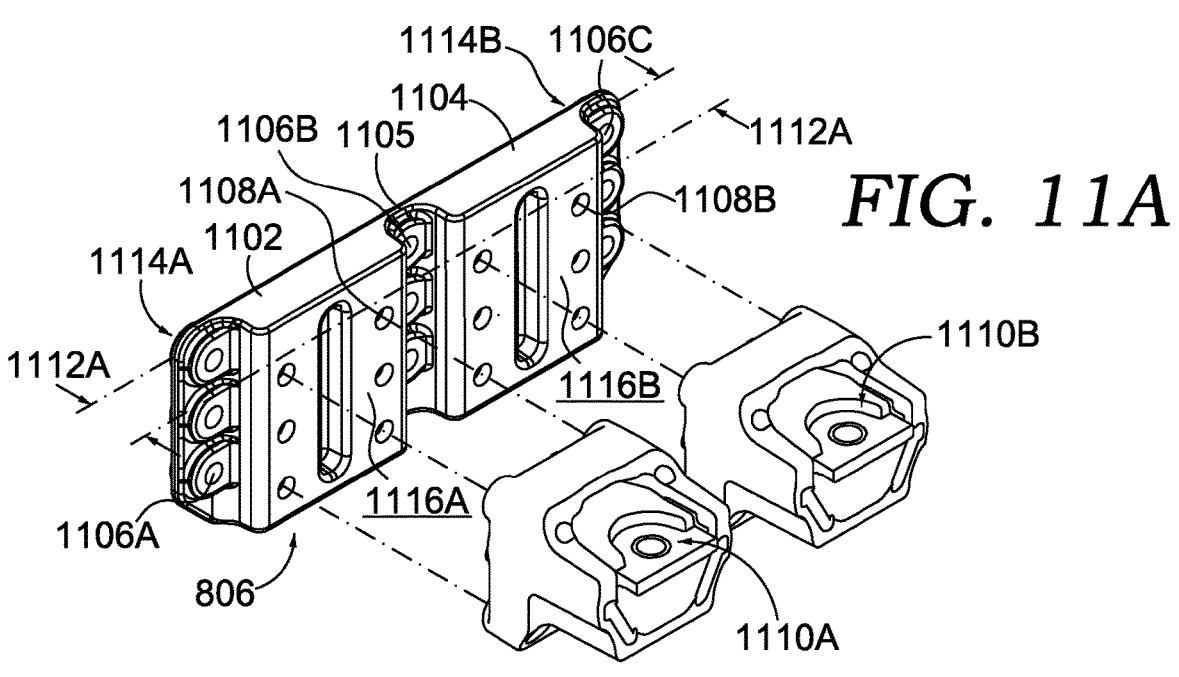
*FIG. 11A*
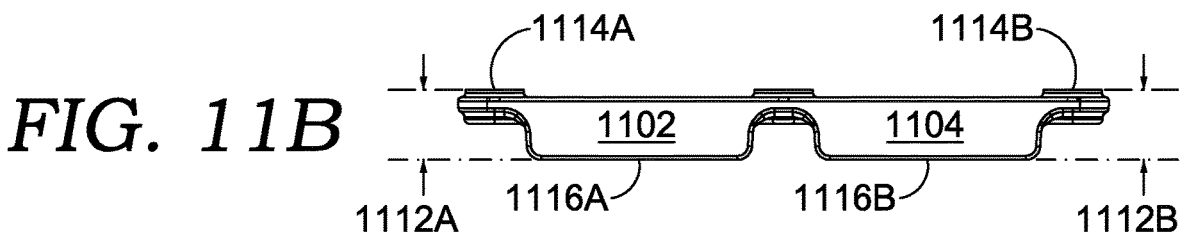
*FIG. 11B*
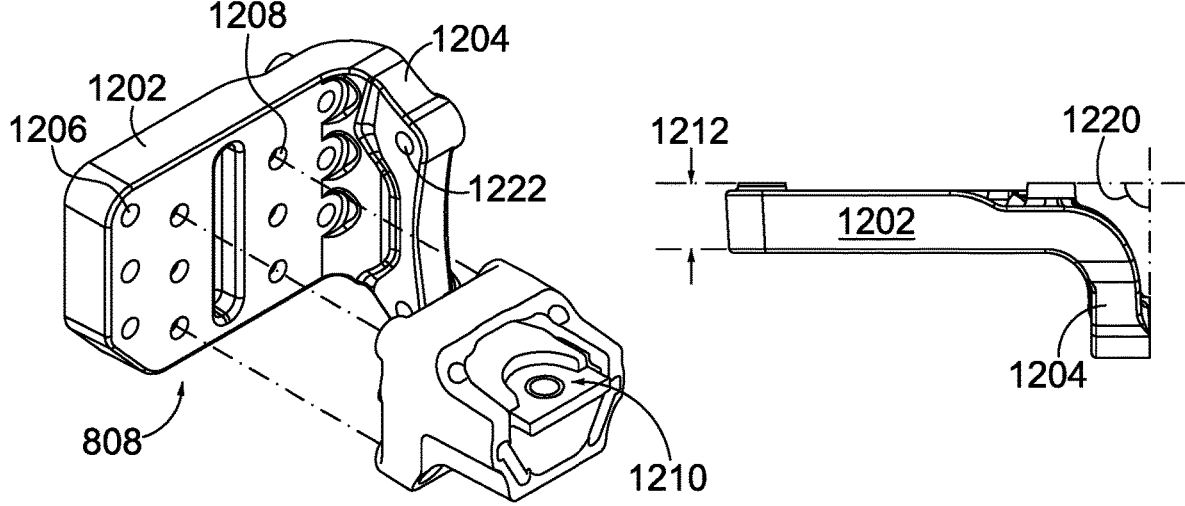
*FIG. 12A*            *FIG. 12B*

MOUNTING ASSEMBLY ATTACHING POWER SUPPLY TO VEHICLE

CROSS-REFERENCE TO RELATED APPLICATIONS

This application claims the priority benefit of U.S. Provisional Application No. 63/330,171 (filed Apr. 12, 2022) and U.S. Provisional Application No. 63/330,175 (filed Apr. 12, 2022). Each of the aforementioned applications is hereby incorporated herein by reference in its entirety.

BACKGROUND

Vehicles can include various types of electric power supply modules, such as batteries, power cells, and the like. Often these power supply modules can be relatively large. As such, electric power supply modules occupy space relative to the vehicle, and positioning of the electric power supply modules can affect the placement of other vehicle components. In addition, power supply modules can be heavy, which can cause strain on mounting components and can contribute to assembly challenges (e.g., needing additional assembly resources).

SUMMARY

This disclosure is related to a mounting assembly for attaching a power supply module (e.g., high-voltage battery or stack of high-voltage batteries) or other components to a vehicle. In particular, this technology includes a mounting assembly for attaching the power supply module at least partially beneath the chassis of the vehicle. For example, the chassis can include a chassis rail (e.g., in a ladder-style chassis) extending in a longitudinal orientation of the vehicle, and one or more power supply modules can be positioned at least partially beneath the chassis rail and have one or more portions extending relatively transverse (e.g., to the vehicle and/or to the chassis rail).

In examples, the mounting assembly can include one or more brackets that are coupled to the power supply module and that attach (directly or indirectly) to the chassis rail. For instance, the one or more brackets, which are coupled to the power supply module, can attach to one or more other brackets mounted to the chassis rail. In examples of the present disclosure, a mounting bracket includes a plate body with one or more flanges that attach beneath an overhang of the power supply module, and as such, a load path can be transferred at least partially through the plate, as opposed to only through one or more fasteners (e.g., bolt). The mounting assembly of the present disclosure can include various other elements described in more detail below.

In examples of the present disclosure, the mounting assembly includes a set of brackets that attach to a power supply module and that are configured to mount the power supply module to a vehicle chassis (e.g., to a longitudinal rail). A power supply module can include various subject matter, such as a high-voltage battery (e.g., a single battery or a stack of batteries), cooling components, low-voltage components, safety systems (e.g. crash detection sensors, interlock components), power-distribution units (including circuit protection, sensors, contactors/relays, circuit boards, and the like), inverters, brake resistors, charging modules and power take-off modules. In some instances the brackets can be installed to a top portion of the power supply module and can be used to secure the power supply module at least partially beneath the vehicle chassis. In addition, one or more of the brackets can include a plate body with a lower flange and an upper attachment portion (e.g., upper flange). The lower flange can, in some instances, be secured beneath an overhang of the power supply module, and the upper attachment portion can attach to the rail (e.g., directly to the rail and/or to another rail-mounted bracket). As indicated above, based on the lower flange attaching below the power supply-module overhang, examples of the present disclosure can transfer at least part of a load path (e.g., created from the weight of the power supply module) through the plate body, as opposed to through a fastener (e.g., bolt).

In at least some examples, the mounting assembly of the present disclosure can secure the power supply module at least partially beneath the chassis rail, such that at least a portion of the power supply module extends into a space below the chassis rail. For example, the power supply module may include a single power supply module or a stack of multiple power supply modules, and the mounting assembly (e.g., a bracket of the mounting assembly) can attach near a top portion of the power supply module. As such, the top portion of the power supply module is configured to hang on or from the mounting assembly, while the lower portions of the power supply module(s) are arranged below the chassis rail (e.g., between sets of front wheels and sets of rear wheels). In at least some examples, by securing the power supply module below the chassis rail, the mounting assembly of the present disclosure makes space that is above the power supply module available for the arrangement of other components, such as power-related components (e.g., power electronics, lines, etc.). In addition, in some examples the mounting assembly includes multiple brackets (e.g., on multiple sides of the power supply module) that, when connected to the power supply module and/or to one another, at least partially enclose a space above the power supply module. In some examples, the at least partially enclosed space can be configured to house and support other power-related components that operate in conjunction with the power supply module, such as power electronics, lines (e.g., plumb lines, power cables), etc. As such, examples of the present disclosure can mount the power supply module in a confined space with volume restrictions, such as within the wheel base of the vehicle, while also creating space for other components to be housed or associated with the vehicle.

Furthermore, in some instances, brackets of the mounting assembly can be configured to connect to, or otherwise interface with, power-related components. For example, at least one of the brackets of the mounting assembly can be configured to attach near a side of the vehicle (e.g., driver side of the vehicle). In some examples the bracket attached near the side of the vehicle can include one or more elements for interfacing with one or more charging ports. For example, the bracket can attach to a vehicle-side charger inlet (e.g., configured to mate with a charger at a charging station). In some instances, the bracket can include an inclined orientation that positions the vehicle-side charger inlet a more ergonomic charger-insertion angle (e.g., as compared to a less included orientation or a horizontally oriented insertion angle). In addition, as mentioned, the mounting assembly can support and house various components extending from the vehicle-side charger inlet to power electronics and/or other components that are configured to receive power from the charging station.

In some examples, brackets of the mounting assembly can be conducive to more efficient manufacturing (e.g., cut and press brake), which can allow the mounting brackets to be customized for a given application (e.g., based on power-unit sizes/structure, power-related componentry configurations, vehicle structure and size, etc.). For instance, in some examples, sheet metal brackets of the mounting assembly can be constructed from a single material by cutting a flat pattern and making appropriate folds (e.g., a fold to create a flange or other attachment point). Among other things, this can increase design versatility since flat patterns can be modified to fit different sizes and structures of vehicles and power equipment.

In at least some examples, brackets of the mounting assembly may be preassembled to the power supply module before being installed on the vehicle. For example, the power supply module, with the brackets installed near a top portion, can be positioned directly beneath the chassis rails and between vehicle wheels. The power supply module can then be lifted towards the chassis rails (e.g., via a hoisting bracket of the mounting assembly) to an appropriate height, and the brackets can be secured to the chassis rails. For instance, the brackets can be fastened directly to the chassis rail or can be fastened to a rail-mounted bracket. In examples, the mounting assembly and related method(s) of attachment of the present disclosure can allow for more efficient vehicle assembly (e.g., decrease tack time), based on the manner in which the mounting assembly can be pre-assembled to the vehicle and lifted vertically from beneath the chassis for attachment to the vehicle (e.g., as opposed to having to both lift vertically and traverse/slide horizontally).

Some examples of the present disclosure can include rail-mounted brackets that attach to the chassis rail and that are configured to attach to the brackets mounted on the power supply module. The rail-mounted brackets can include various structures and perform various functions. For instance, the rail-mounted brackets can attach to a vibration damper (e.g., isolator or battery isolator) that is configured to isolate movement or vibration associated with the vehicle from the power supply module. That is, when the power supply module is mounted to the chassis rail, the vibration damper isolates the power supply module from other parts of the vehicle (e.g., the chassis). In at least some examples, in addition to attaching to brackets mounted on the power supply module, the rail-mounted bracket can also attach to a portion of a side-impact protection system. In this respect, the rail-mounted bracket can be dual purpose by connecting both the power supply module and the side-impact protection system to the chassis rail.

In one or more additional examples, the rail-mounted bracket can provide a more uniform mounting surface to which a power supply module may be attached. That is, in some examples, the chassis rail can include one or more side walls that, based on a bend or other surface change, change orientation and that, as such, provide an uneven mounting surface. As such, the rail-mount bracket may include a tapered or varied thickness or other leveling feature (e.g., leveling feet) to account for a rail's uneven mounting surface and provide an even mounting interface or mounting positions along the rail for one or more power supply modules.

DETAILED DESCRIPTION OF DRAWINGS

The present systems and methods that relate to a mounting assembly for attaching a power supply to a vehicle are described in detail below with reference to these drawings figures.

FIG. 1 depicts a vehicle with power supply modules mounted below chassis rails, in accordance with examples of this disclosure.

4

FIGS. 7A-7D depict mounting bracket flat and formed-patterns, in accordance with an example of this disclosure.

FIGS. 9A and 9B depict an angled, rail-mount bracket, in accordance with an example of this disclosure.

FIG. 10 depicts a varied-thickness, rail-mount bracket, in accordance with an example of this disclosure.

FIGS. 11A and 11B depict a rail-mount bracket (e.g., having portions with similar thickness), in accordance with an example of this disclosure.

FIGS. 12A and 12B depict another angled, rail-mount bracket, in accordance with an example of this disclosure.

DETAILED DESCRIPTION

This detailed description is related to a mounting assembly for attaching a power supply module (e.g., high-voltage battery or stack of high-voltage batteries) or other components to a vehicle. In particular, this technology includes a mounting assembly for attaching the power supply module at least partially beneath the chassis of the vehicle. For example, the chassis can include a chassis rail (e.g., in a ladder-style chassis) extending in a longitudinal orientation of the vehicle, and one or more power supply modules can be positioned at least partially beneath the chassis rail and have one or more portions extending relatively transverse (e.g., to the vehicle and/or to the chassis rail). Stated differently, the longitudinal orientation of the power supply module can be oriented perpendicular to the longitudinal orientation of the chassis rail.

In examples, the mounting assembly can include one or more brackets that are coupled to the power supply module and that attach (directly or indirectly) to the chassis rail. For instance, the one or more brackets, which are coupled to the power supply module, can attach to one or more other brackets mounted to the chassis rail. In examples of the present disclosure, a mounting bracket includes a plate body with one or more flanges that attach beneath an overhang of the power supply module, and as such, a load path can be transferred at least partially through the plate, as opposed to only through one or more fasteners (e.g., bolt). The mounting assembly of the present disclosure can include various other elements described in more detail below.

These and other aspects are described further below with reference to the accompanying drawings. The drawings are merely example implementations, and should not be construed to limit the scope of the claims. For example, while the example vehicles are shown and described as being heavy-duty or medium-duty trucks, aspects described herein can be used with a variety of other vehicle sizes, classes, and types (e.g., light duty trucks and other passenger vehicles, buses, trams, carts, and the like). In addition, the subject matter of this disclosure can be used with internal combustion engine ("ICE") vehicles, electric vehicles ("EV"), battery electric vehicles ("BEV"); hybrid electric vehicles ("HEV"), plug-in electric vehicles ("PHEV"), and with fuel-cell electric vehicles ("FCEV"), among others.

As used herein, the terms "about" and "substantially" mean +/−10% of a given value, such as a dimensional value (e.g., height, width, etc.). In addition, with respect to an angle, or the terms parallel and perpendicular, the terms "about" and "substantially" mean within 10 degrees. If the "about" or "substantially" is otherwise used, the term can, where appropriate, include equivalents of the modified element.

Figure 1:
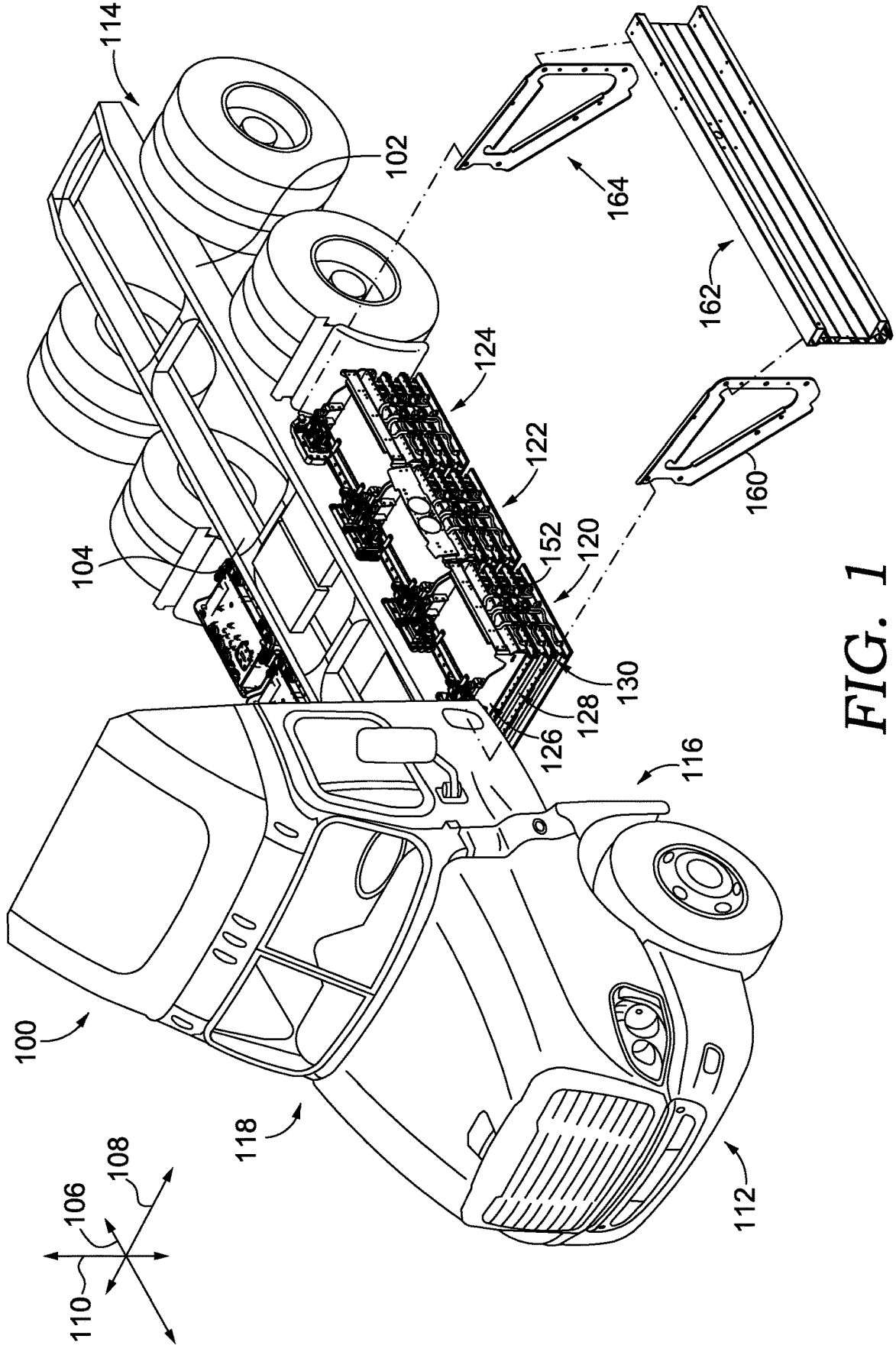

Referring now to FIG. 1, FIG. 1 depicts an example vehicle 100 including a first chassis rail 102 and a second chassis rail 104. In general, the vehicle 100 can be associated with various axes or orientations, including a longitudinal axis 106, a transverse axis 108 (or lateral), and a vertical axis 110. In addition, the vehicle 100 generally includes a front 112, a back 114, a left side 116, and a right side 118. In examples, the chassis rails 102 and 104 extend in the longitudinal axis 106, from near the front 112 to near the back 114.

Figure 2:
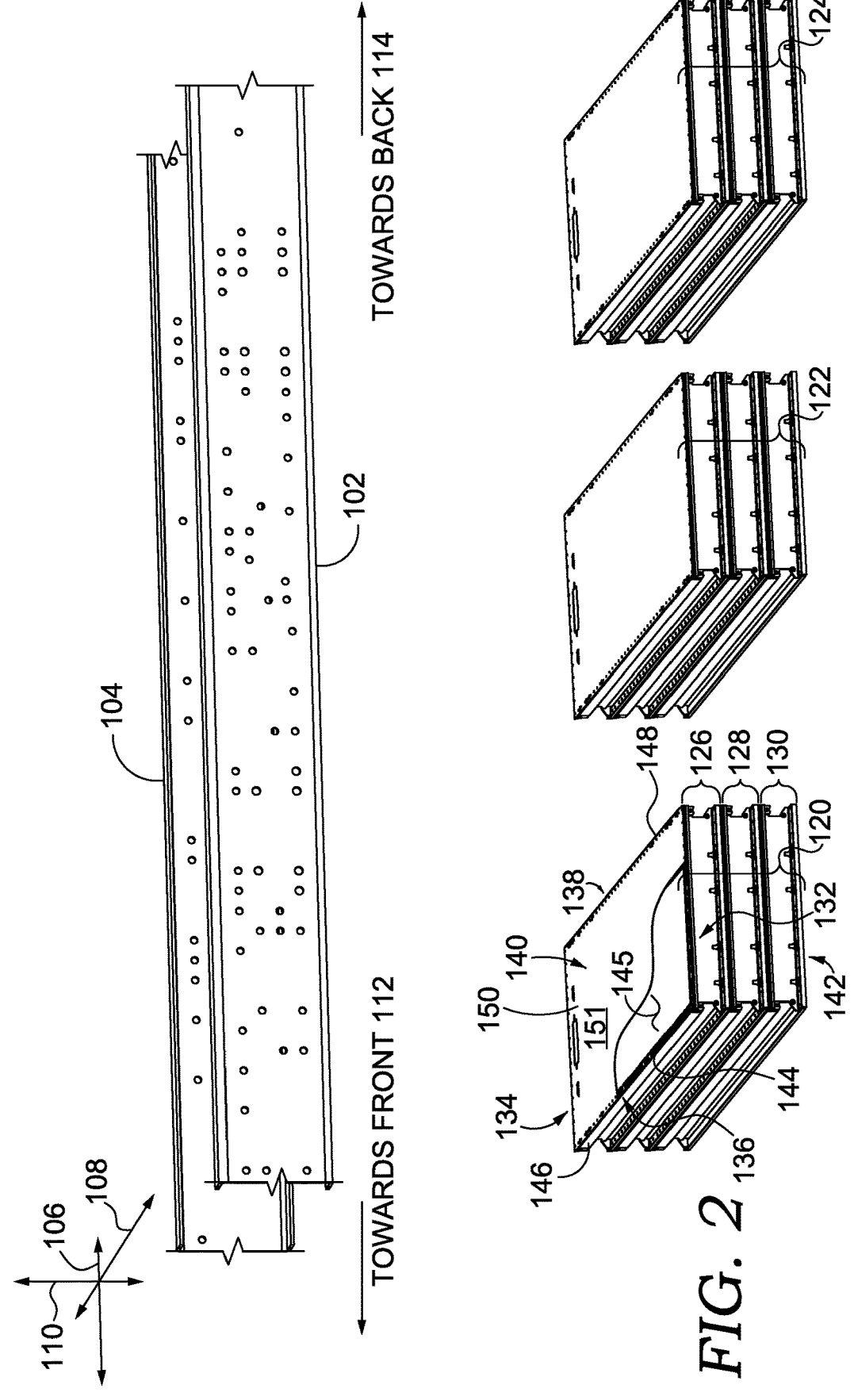
FIG. 2 depicts chassis rails and relative positioning of power supply modules below the chassis rails, in accordance with examples of this disclosure.

In examples of the present disclosure, the vehicle 100 includes one or more power supply modules positioned beneath the chassis rails 102 and 104. In some embodiments, the one or more power supply modules are positioned fully beneath the chassis rails. In some embodiments, the one or more power supply modules are positioned partially, at least partially, or mostly beneath the chassis rails. For example, in FIG. 1 (and also referring to FIG. 2), the power supply modules can include one or more power supply-module stacks 120, 122, and 124, and a power supply-module stack (e.g., 120) can include one or more power supply modules 126, 128, and 130. FIGS. 1 and 2 depict three power supply-module stacks 120, 122, and 124, and in other examples, techniques of the present disclosure can include mounting assemblies for one or more power supply-module stack, and a power supply-module stack may include two or more power supply modules. In addition, techniques of the present disclosure can include a mounting assembly for a power supply module that is not stacked (e.g., the mounting assembly can mount the non-stacked power supply module to the vehicle).

A power supply module and a power supply-module stack can have various relative portions, which can relate to the vehicle 100 and/or to one another. For example, a power supply module and/or a power supply-module stack can include a first end 132 (e.g., left end relative to the vehicle left side 116); a second end 134 (e.g., right end relative to the vehicle right side 118); a first side 136 (e.g., front side relative to the vehicle front 112); a second side 138 (e.g., back side relative to the vehicle back 114); a top side 140; and a bottom side 142. These relative descriptors are provided for explanatory purposes to orient components and are not necessarily meant to be limiting.

In some examples, a power supply module (e.g., 126) can include an encasement 144 (FIG. 2) that includes a partially enclosed volume 145, which houses multiple power cells and other power components (not shown). Although the power supply module depicted in the figures can have the elements that are illustrated, it can also include a variety of other types of rechargeable batteries, such as those that can be used for vehicles. In examples, the power supply module can include a lithium-ion battery. In examples, the power supply module can include a lead-acid battery.

In examples, the encasement 144 can include various structures and components, and in at least one example, the encasement includes one or more overhangs. For instance, FIG. 2 depicts an overhang 146 on the first side 136 of the power supply module 126 and an overhang 148 on a second side 138 of the power supply module 126. In some examples, the overhangs 146 and 148 extend at least most of a length of the encasement 144 (e.g., from the first end 132 to the second end 134). In some examples, the overhangs 146 and 148 can extend partially along a length of the encasement 144. In addition, the overhang 146 and 148 can include a plurality of overhangs positioned along a side of the encasement (e.g., an overhang positioned more towards the left side/end and another overhang positioned more towards the right side/end). In examples, a power supply module can include one or more portions aligned or extending in the transverse orientation 108 (relative to the vehicle 100 and the rails 102 and 104). For example, the longitudinal orientation of the power supply module can be oriented perpendicular to the longitudinal orientation of the chassis rail. Stated differently, the power supply module (e.g., 126) can include various dimension that define the size and/or shape of the power supply module, and as used herein, the longitudinal orientation refers to the orientation aligned with the longest portion of the power supply module. In examples, it is this longitudinal orientation of the power supply module that is transverse or perpendicular to the longitudinal orientation of the vehicle and/or the chassis rails. Discussed herein, the longitudinal orientation of the vehicle and/or chassis rails refers to the general direction proceeding from a front of the vehicle to a back of the vehicle, or more specifically, in a tractor-to-trailer orientation (as opposed to a width of the vehicle, i.e., vehicle side to opposite vehicle side).

In addition, in some examples and based on the positioning of the power supply module 126, the overhang 146 can be oriented (relative to the overhang 148) towards the front 112 of the vehicle 100, and the overhang 148 can be oriented (relative to the overhang 144) towards the back 114 of the vehicle 100. This is one example, and the relationship between overhangs 146 and 148 can be described in various manners, such as by the overhang 146 being closer than the overhang 148 to the front 112 and the overhang 148 being closer than the overhang 146 to the back 114. It is within the scope of this disclosure that additionally or alternatively, one or more overhangs may be included and oriented on opposing sides where one overhang is oriented towards one side of the vehicle and another opposing overhang is positioned towards the opposing side of the vehicle.

Figure 15:
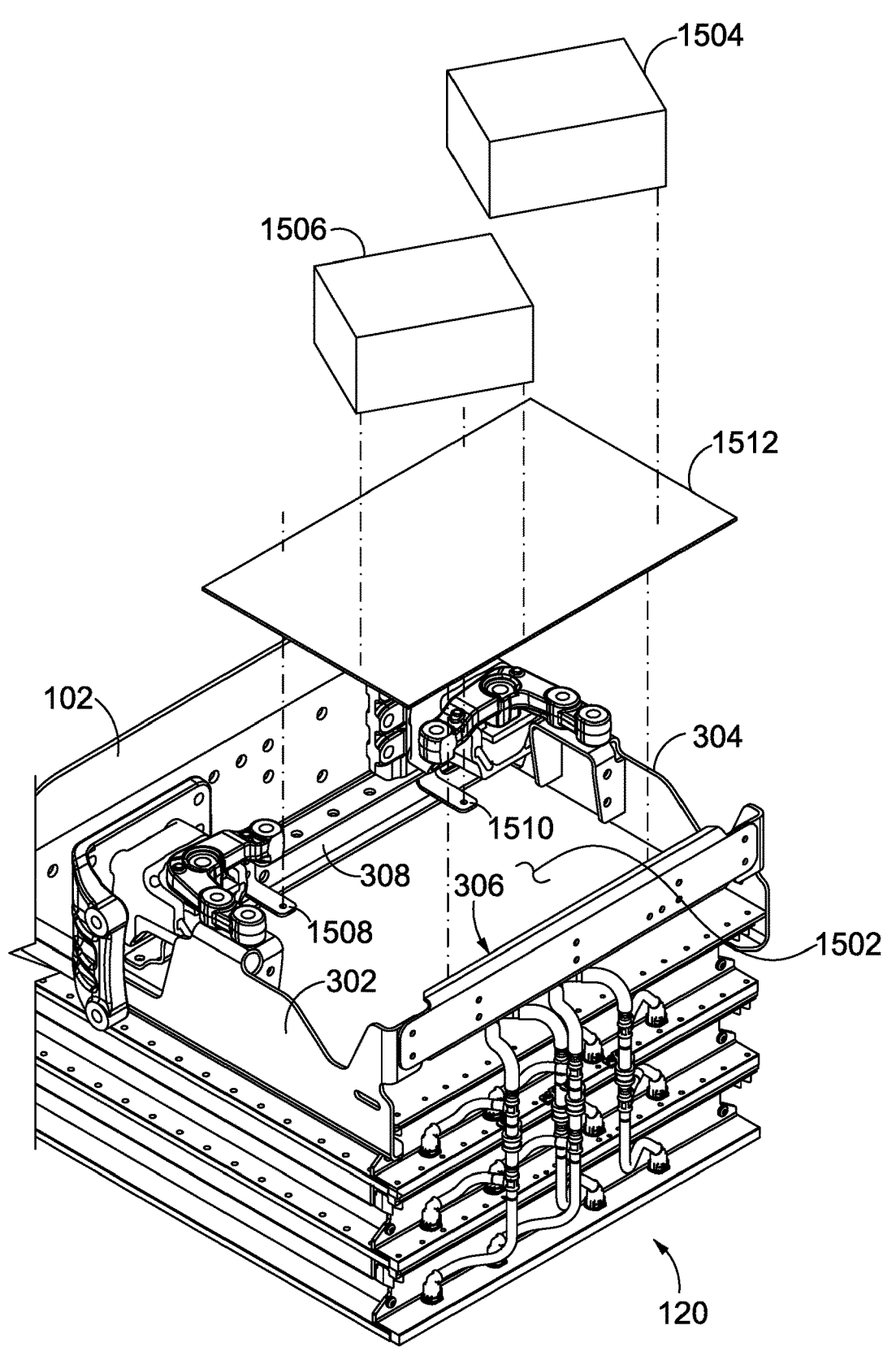
FIG. 15 depicts the power supply-module stack mounted below the chassis rail and additional power components, in accordance with an example of this disclosure.

In addition, the power supply module 126 can include a lid 150 (e.g., top plate that fastens to the encasement 144), or when stacked, an encasement (e.g., 144) that is stacked atop another encasement (e.g., of power supply module 128)

can enclose the top of the lower encasement. In some instances, the lid 150, or some other structure atop the encasement, can include a face 151 that is oriented towards or faces the chassis rail(s). In some examples, a power supply module or a power supply-module stack can be combined with various other components, such as coolant lines (e.g., coolant lines 152 in FIG. 1 and FIG. 3), power electronics (e.g., power electronics 1504 and 1506 in FIG. 15), and power cables (e.g., cables 626 in FIG. 6).

In examples, a power supply module (e.g., 126), a power supply-module stack (e.g., 120, 122, and 124), power-related components (e.g., coolant lines, power electronics, power cables, etc.), or any combination of these, can be associated with a relatively large spatial volume when assembled with the vehicle, and as such, a location of one or more of these components can affect the placement of other components on the vehicle 100. In addition, on account of the spatial volume, the available mounting locations can be limited. These components can also be relatively heavy, which can also affect mounting location, mounting components, and assembly method. At least some examples of this disclosure are related to an assembly for mounting a power supply module and/or a power supply-module stack to the vehicle 100.

Figure 3:
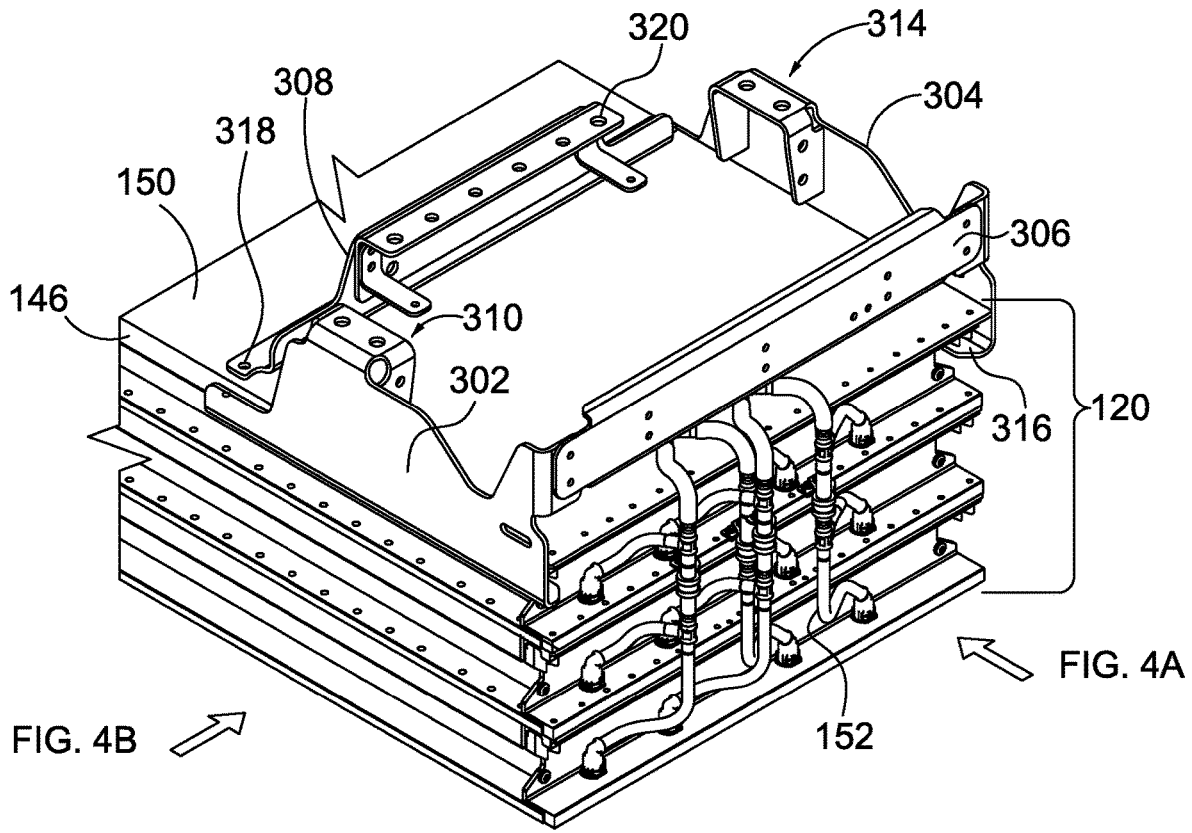
FIG. 3 depicts a power supply-module stack with mounting brackets, in accordance with examples of this disclosure.
Figure 4A:
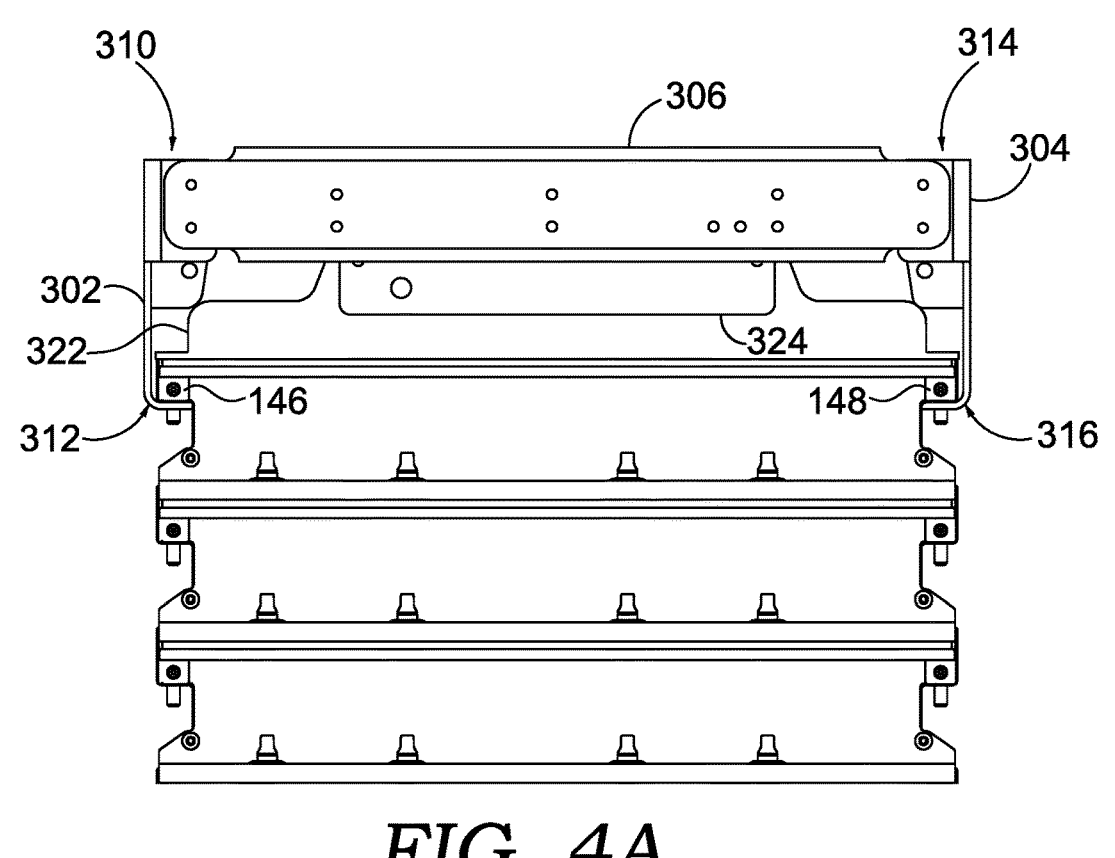
FIG. 4A depicts an end, elevation view, of FIG. 3, in accordance with an example of this disclosure.
Figure 4B:
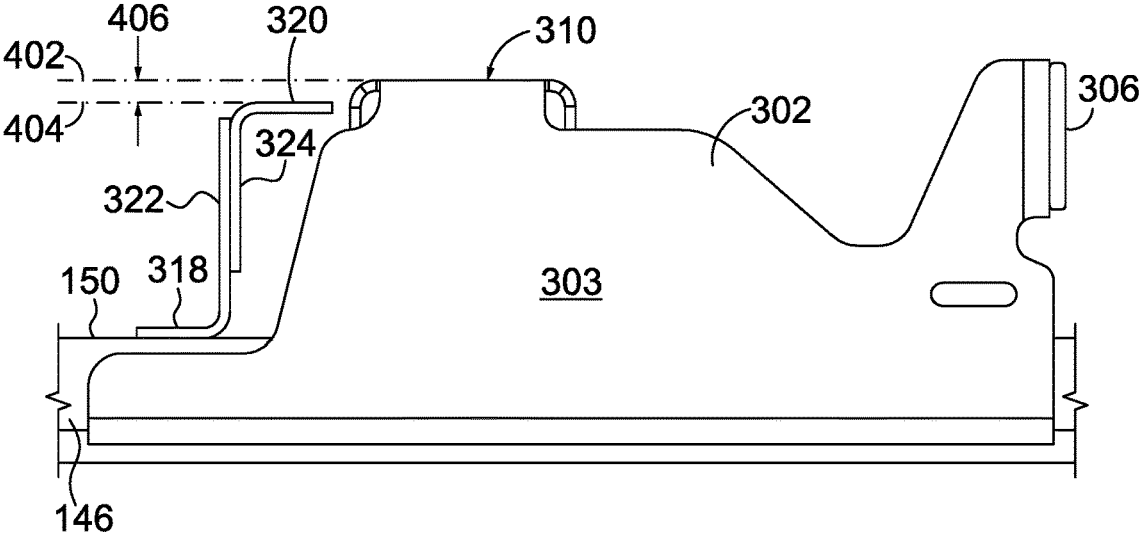
FIG. 4B depicts a side, elevation view, of a portion of FIG. 3, in accordance with an example of this disclosure.
Figure 5:
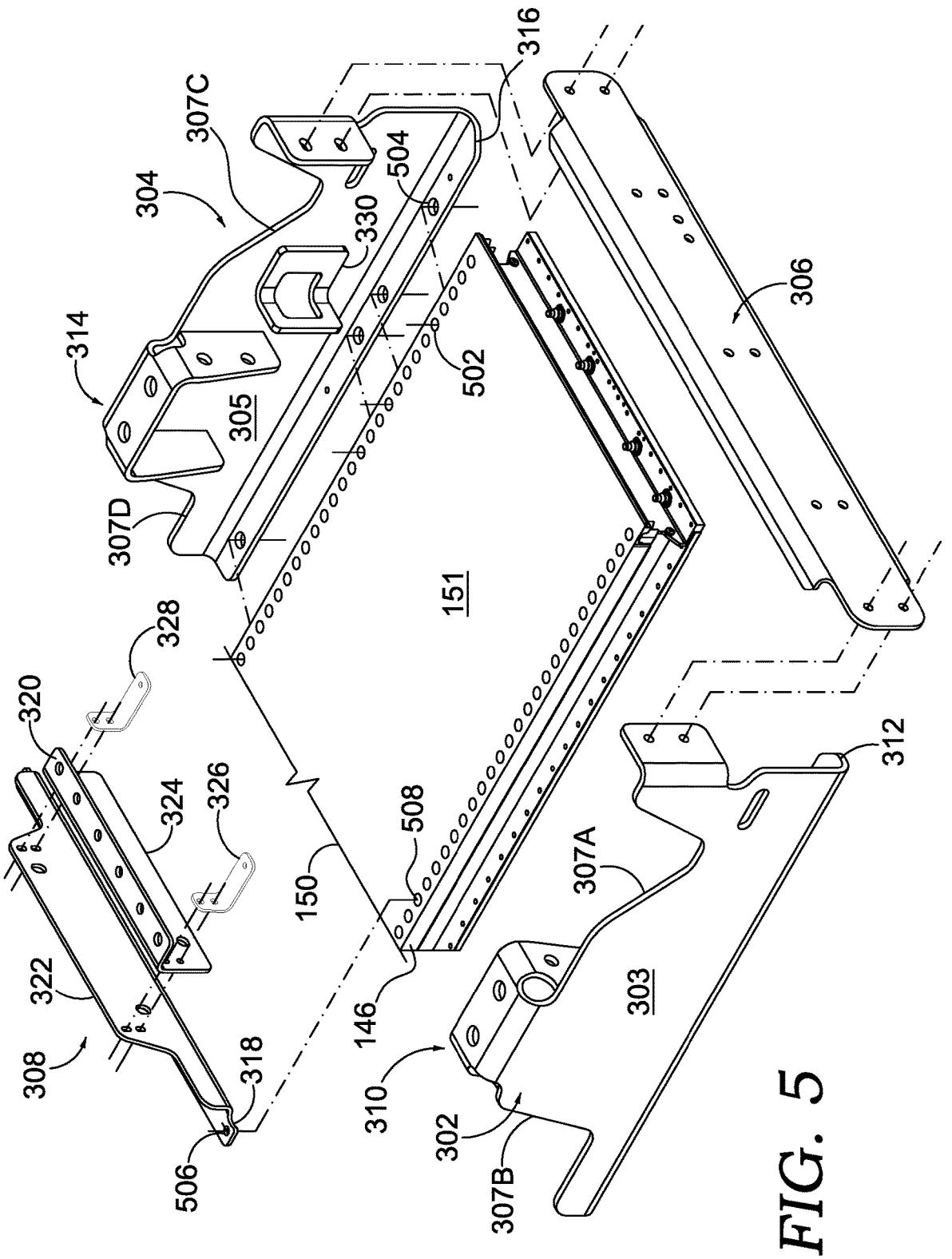
FIG. 5 depicts a partially deconstructed view of a power supply module and mounting brackets, in accordance with an example of this disclosure.

Referring to FIGS. 3, 4A and 4B and 5, examples of the present disclosure are illustrated, including brackets of a mounting assembly that are connected to the power supply-module stack 120 and that can connect the power supply-module stack 120 to a vehicle chassis rail. FIG. 3 depicts a perspective view of a portion of the power supply-module stack 120; FIG. 4A depicts an end, elevation view of FIG. 3; FIG. 4B depicts a side elevation view of a portion of FIG. 3; and FIG. 5 depicts a partially deconstructed view of the brackets and the power supply module.

In examples, the brackets can includes a first side bracket 302, a second side bracket 304, an end bracket 306, and an inboard bracket 308 (partially obscured from view by the end bracket 306 in FIG. 4A). The brackets 302, 304, 306, and 308 can connect to the power supply module (e.g., top power supply module of the stack 120), to one another, or any combination thereof. In at least one example, one or more of the brackets includes a top portion for attaching to the chassis rail and a bottom portion for mounting underneath an overhang of the power supply-module stack (or an overhang of a power supply module within the power supply-module stack). That is, in general, the brackets 302 and 304 can include a main bracket body 303 and 305 (FIG. 5) that provides a foundation or platform from which mounting or other structures (e.g., for bracket attachment, power-component attachment or routing, etc.) can extend. For example, the first side bracket 302 can include (e.g., extending from the main bracket body 303) a top portion 310 for attaching (directly or indirectly) to the chassis rail and a flange 312 that attaches underneath the overhang 146, and the second side bracket 304 can include (e.g., extending from the main bracket body 305) similar elements, such as a top portion 314 to attach (directly or indirectly) to a chassis rail and a flange 316 for attaching beneath the overhang 148. Further, in some examples, the brackets 302 and 304 can include bracket perimeter edges 307a-307d (e.g., notches or other cutout profiles) that are shaped to fit other vehicle components, such as to allow the routing and placement of power components (e.g., cables).

In some examples, fasteners (e.g., bolts) can extend through holes in the top plate 150, the overhang (e.g., 146 and 148), and the flange (e.g., 312 and 316) in order to attach the bracket (e.g., 302 and 304) to the power supply module.

For example, FIG. 5 illustrates multiple alignments (and fastener paths), such as associated with the top fastener receiving hole 502 and the flange fastener receiving hole 504. As indicated above, based on the flange 312 and/or 316 attaching below the power supply-module overhang, examples of the present disclosure can transfer at least part of a load path (e.g., created from the weight of the power supply module) through the plate body of the bracket 302 and/or 304, as opposed to only or mostly through the fastener (e.g., bolt).

The brackets 302, 304, 306, and 308 can include various other elements. For example, the end bracket 306 can attach to the first side bracket 302 and the second side bracket 304. Among other things, the end bracket 306 can provide a mounting structure for power components (e.g., power electronics 1504 and 1506 in FIG. 15 and power cables), and the attachment of the end bracket 306 to the side brackets 302 and 304 can provide structural stability and rigidity to the mounting assembly (e.g., the combination of the side brackets 302 and 304 and the end bracket 306).

In addition, the brackets 302, 304, 306, and 308 can include one or more elements for assisting with moving (e.g., during assembly to a chassis rail) the power supply module or power supply-module stack. For example, the brackets can include a hoist bracket 330 (FIG. 5) that can extend from a portion of the side brackets 302 and/or 304. That is, a hoist bracket (e.g., similar to the hoist bracket 330 in FIG. 5) can extend from the side bracket 302; the hoist bracket 330 can extend from the side bracket 304; or separate/respective hoist brackets can extend from the side bracket 302 and the side bracket 304. The hoist bracket 330 can include a hook or other eyelet to which a hoisting device can be secured. The hoist bracket 330 can be a separate bracket that is affixed to the side bracket(s) 302 and/or 304. In some examples, the hoist bracket 330 can be cut and folded from the bracket body 303 and/or 305.

In at least some examples, the inboard bracket 308 can include a lower flange 318 for attaching to the top 150 of the power supply module or the power supply-module stack and an upper flange 320 for attaching (directly or indirectly) to the chassis rail. For example, FIG. 5 illustrates an alignment or fastener path associated with the fastener receiving apertures 506 and 508. The inboard bracket 308 can include a first inboard bracket 322 (with the lower flange 318) and a second inboard bracket 324 (with the upper flange 320) that are coupled (e.g., via fasteners) to function together as a single bracket assembly or inboard bracket assembly (e.g., inboard bracket 308). In some examples, the inboard bracket 308 can include a single plate folded or bent to include the lower flange 318 and the upper flange 320. The inboard bracket 308 can include various other components, such as power-electronics mounting brackets 326 and 328 that can attach to, and support, power electronics and/or a support bracket for power electronics.

In at least some examples, the portions of the brackets 302, 304, and 308 that are for attaching to the chassis rail can include various relative heights. For example, referring to FIG. 4B a reference line 402 represents a plane that is aligned with an uppermost portion of the top portion 310 for mounting the bracket 302 to the chassis rail, and a reference line 404 represents a plane that is aligned with an uppermost portion of the flange 320 for mounting the inboard bracket 308 (e.g., including the brackets 322 and 324) to the chassis rail. In examples of the present disclosure, the top portion 310 can be offset (e.g., vertically offset) relative to the flange 320 by an offset distance 406, and a similar offset can exist as between the brackets 304 and 308. In some examples, the offset distance 406 can arise from a shorter inboard bracket 308 (relative to the side brackets 302 and 304), and the shorter inboard bracket 308 can provide fit advantages, such as by fitting around other vehicle components or providing space savings. In addition, the relatively shorter height of the inboard bracket 308 (and the resulting offset distance 406) can provide space to position and run additional power components (e.g., HV cables, LV harness, coolant lines, etc.) below the rails. In some examples, the attachment of the brackets 302, 304, and 308 can include one or more other components (e.g., connector brackets such as 1302 and 1304) that are configured to (e.g., shaped to) accommodate for the various relative heights. In some examples, the brackets 302, 304, and 308 can include consistent heights.

In at least some examples, one or more of the brackets 302, 304, 306, and 308 can be collectively considered a mounting assembly for one side or end of a power supply module or power supply-module stack, such as an end of the power supply-module stack 120 that is configured to be outboard and leftward of the chassis rail 102 (e.g., based on the orientation in FIG. 1 and from a rear perspective of a vehicle). A similar set of brackets can be used for other power supply modules or power supply-module stacks that are also to be mounted to the vehicle 100. For example, a similar set of brackets can be used to mount the end of the stack 124 that is outboard and leftward of the chassis rail 102. Further, a similar set of brackets can be used for the stack 122, or a set of brackets with different features can be used for the stack 122, as described below with respect to FIG. 6. In some examples, a similar set of brackets can be used for the ends of the stacks 120, 122, and 124 that are outboard and rightward of the chassis rail 104 (e.g., based on the orientation in FIG. 1 and from a rear perspective of a vehicle). These sets of brackets on the opposing side can be similar in various respects, such as by including side brackets, an end bracket, and an inboard bracket, as well as one or more flanges for mounting below the power supply-module overhangs. In addition, these sets of brackets on the opposing side can include other or different features, such as to account for different power-related components that can be mounted on the right side of the vehicle.

Figure 6:
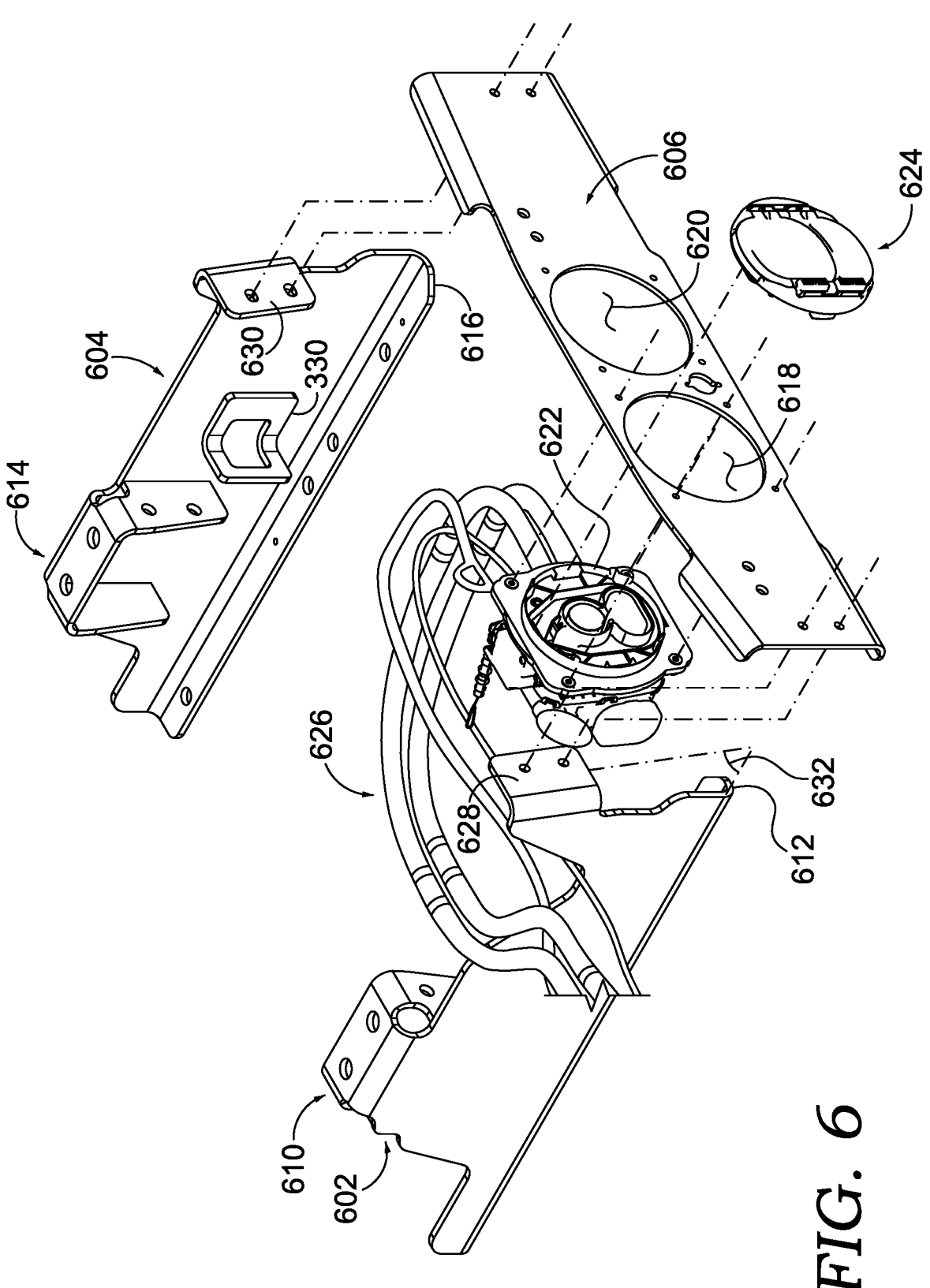
FIG. 6 depicts a deconstructed view of a power supply module and mounting brackets, which can interface with one or more charging components, in accordance with an example of this disclosure.

Referring to FIG. 6, in some examples of the present disclosure, brackets forming part of a mounting assembly can have additional or different features from the brackets 302, 304, 306, and 308, such as to account for different locations and/or power components associated with the vehicle. FIG. 6 includes brackets 602, 604, and 606, of a mounting assembly (e.g., charging-interface mounting assembly) that operate in some respects similar to the brackets 302, 304, and 306, such as by including top portions 610 and 614 for connecting (directly or indirectly) to the chassis rail and flanges 612 and 616 for mounting beneath one or more overhangs of a power supply module or power supply-module stack.

In some examples, the brackets 602, 604, and 606 can provide one or more elements for interfacing with one or more charging components of a charging system for providing electric power to be stored by one or more of the power supply modules in the power supply-module stacks 120, 122, and 124. As such, for descriptive purposes and to distinguish from the brackets 302, 304, and 306, the brackets 602, 604, and 606 can be referred to as a "charging-interface mounting assembly," and this is for descriptive purposes only and not to be limiting. In some examples, an end bracket 606 can include one or more elements for interfacing with charging components. For example, the end bracket 606 can include one or more openings 618 and 620 for receiving charging components, and although FIG. 6 shows two openings 618 and 620, the end bracket 606 may include one opening or more than two openings. In some examples, a charger plug-in module 622 can be affixed (e.g., via fasteners) on one side of the opening 618, and a charging-port cover 624 can be attached to the module 622 and/or to the end plate 606 and accessible from an opposing side (e.g., leftward most side if on the left side of the vehicle, based on the orientation in FIG. 1 and from a rear perspective of a vehicle) of the opening 618 to manage access to the module 622. From the charger plug-in module 622, power cables 626 can extend to one or more other components (e.g., power electronics) of the power supply modules and/or power supply-module stacks, such as for power conversion before storage.

In at least some examples, the side brackets 602 and 604 can also include features for charging. For instance, the side brackets 602 and 604 include respective end-bracket mounting flanges 628 and 630, and in examples, the end-bracket mounting flanges 628 and 630 can be oriented at an angle (e.g., reference angle 632, including an acute angle between about 0 degrees and 90 degrees) relative to the bottom flanges 612 and 616. As such, when the end bracket 606 is fastened to the side brackets 602 and 604, the end bracket 606 and the charger plug-in module 622 (which is attached to the end bracket 606) are also oriented at an angle (e.g., similar to, and resulting from, the angle 632). In some instances, the angle of orientation of the charger plug-in module 622 provides an ergonomic charger connection angle for an operator to insert a vehicle charger (e.g., fast charger) into the charger plug-in module 622. That is, the resulting upwardly oriented charger plug-in module 622 can be positioned for more ergonomic charger connection as compared with a charger plug-in module that is more horizontally oriented.

In some examples, brackets of the mounting assembly can be conducive to more efficient manufacturing of highly customizable solutions. FIGS. 7A-7D illustrate various views of the side brackets 304 and 604. For example, FIGS. 7A and 7B illustrate an elevation and perspective view, respectively, of the bracket 304, and FIGS. 7C and 7D illustrate an elevation and perspective view, respectively, of the bracket 604. In at least some examples, the brackets 304 and 604 (as well as the brackets 302 and 602), can be cut (e.g., laser cut) based on a flat pattern, and in each figure, an example flat pattern is illustrated in dash lines. In addition, once cut, each sheet metal part can be folded (e.g., via press brake channels) to form mounting flanges and other features for use as part of the mounting assembly. In examples, this solution allows for the brackets to be easily customized based on specific vehicular and/or power-component configurations, since the manufacturing process can be quickly updated with different cut and fold patterns. For example, the profile of bracket edges (e.g., 702 and 704), sizes and locations of mounting surfaces, and the like can be easily and quickly modified from one batch of parts to the next by uploading a new cut pattern and executing designated folds/bends. In addition, existing press-brake channels can be reused for new bracket configurations, which can reduce costs and time associated with new tooling. This approach is in contrast to other techniques that may be more limiting by relying on more generic components (e.g., generic extrusions or brackets) and that as such, can include more intensive efforts to update mounting solutions by rearranging the mounting components and/or the power components.

Figure 8A:
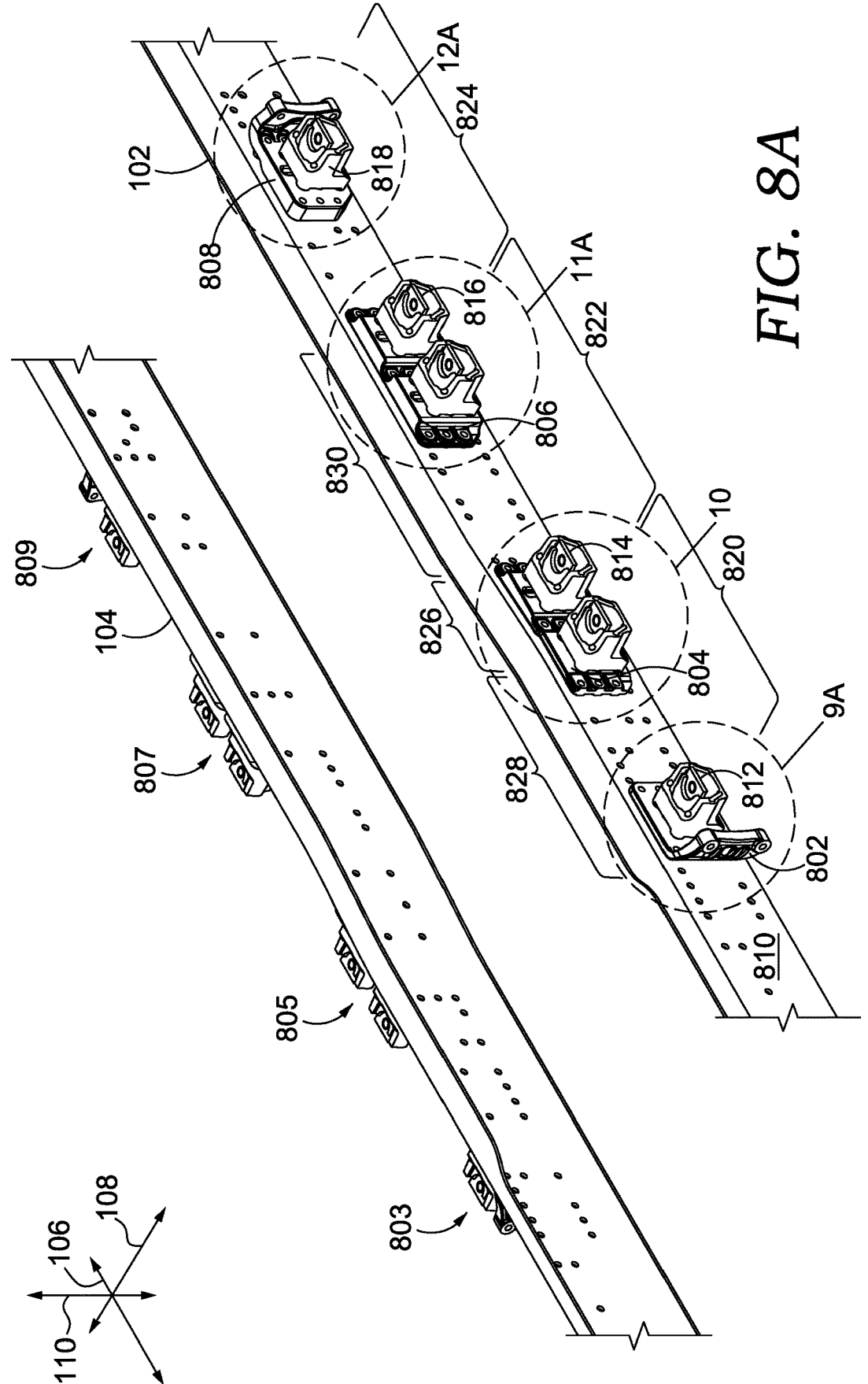
FIG. 8A depicts chassis rails with rail-mount brackets, in accordance with an example of this disclosure.
Figure 8B:
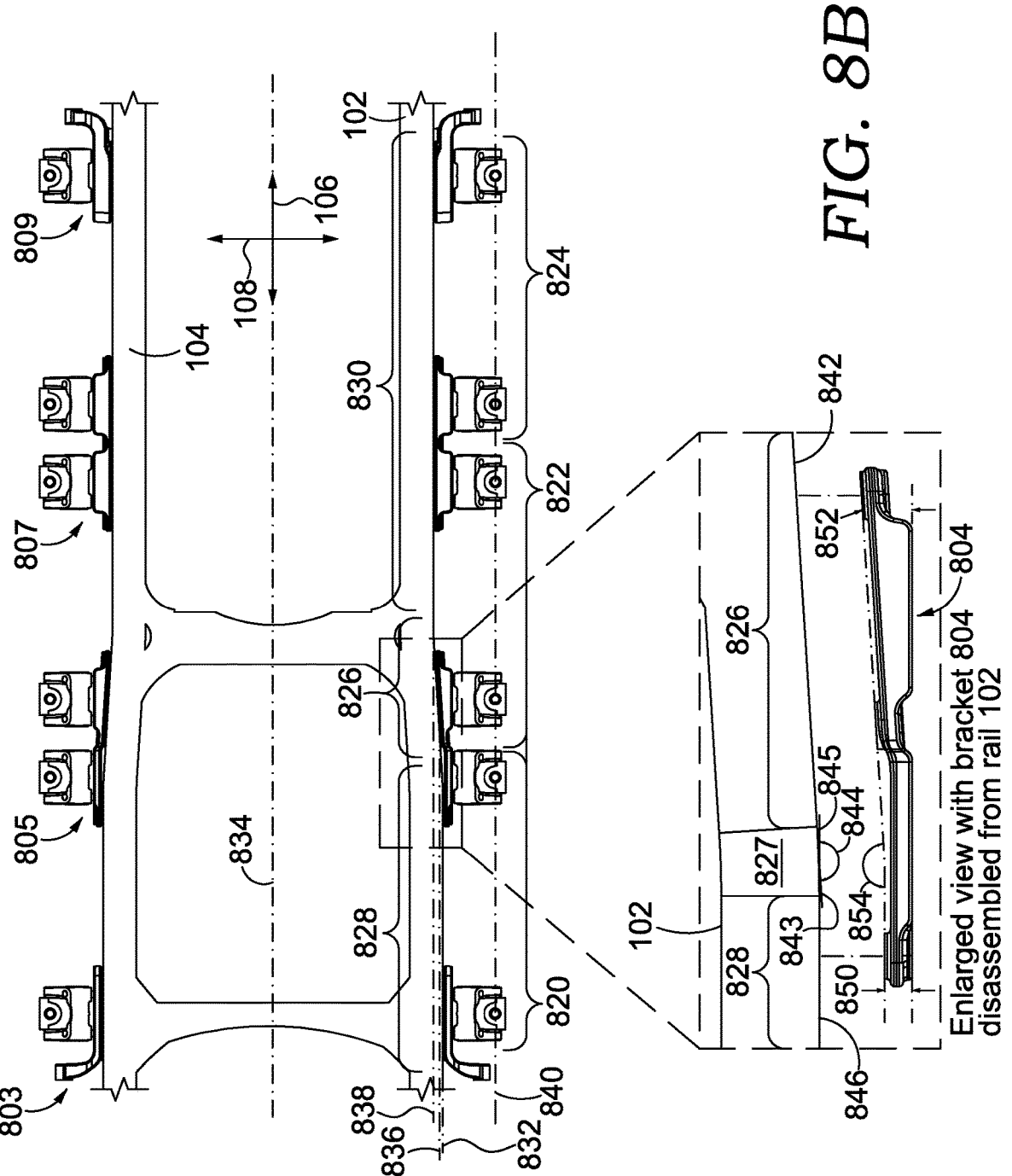
FIG. 8B depicts a plan view from above of FIG. 8A, in accordance with an example of this disclosure.

Referring to FIGS. 8A-8B, 9A-9B, 10, 11A-11B, and 12A-12B, at least some examples of the present disclosure can include rail-mount brackets that attach to the chassis rails 102 and 104 and that are configured to attach to brackets (e.g., 302, 304, 308, 602, and 604) mounted on a power supply module or power supply-module stack. For example, FIGS. 8A and 8B illustrate the chassis rails 102 and 104 and various types of rail-mount brackets 802, 804, 806, and 808. The rail-mount brackets 802, 804, 806, and 808 can, in some instances, mount (e.g., via fastener) to an outer sidewall 810 of the chassis rail. In addition, the rail-mount brackets 802, 804, 806, and 808 can attach to vibration dampers (e.g., 812, 814, 816, and 818), which can also be referred to as "isolators" and can operate as an at least partial barrier between the power supply modules and the vehicle frame.

In at least some examples, the rail-mount brackets 802, 804, 806, and 808 can provide multiple positions for mounting a power supply module or a power supply-module stack along the chassis rails 102 and 104. For example, FIGS. 8A and 8B depict that the rail-mount brackets 802 and 804 can, in combination, provide a mounting location 820 at which a power supply module (e.g., power supply module 126) or power supply-module stack (e.g., power supply-module stack 120) can be mounted; the rail-mount brackets 804 and 806 can, in combination, provide a mounting location 822 at which a power supply module or power supply-module stack (e.g., power supply-module stack 122) can be mounted; and the rail-mount brackets 806 and 808 can, in combination, provide a position 824 at which a power supply module or power supply-module stack (e.g., power supply-module stack 124) can be mounted. A similar set of rail-mount brackets 803, 805, 807, and 809 can be provided on the chassis rail 104 for attaching to mounting assemblies on the right side of the vehicle, and in some examples, the brackets 803, 805, 807, and 809 have mirrored symmetry to the brackets 802, 804, 806, and 808 (respectively). As such, the brackets 802 to 809 can provide multiple locations for mounting to the chassis rails 102 and 104 along the longitudinal orientation of the chassis rails and the vehicle.

The rail-mount brackets 802, 804, 806, and 808 can include various constructions, and in examples, the rail-mount brackets 802, 804, 806, and 808 can include a cast construction (e.g., cast metal). In some examples, the cast form can include walls forming a bracket body, opening or apertures to receive a fastener, as well as portions with increased thickness around the fastener openings for increased strength. In addition, the cast form can include features (e.g., angles and contours) configured to perform functions with respect to the chassis rail, to supporting the power supply module(s), and to supporting other structures. In examples, the brackets 802 and 808 are angled rail-mount brackets 802 and 808 (also depicted in an enlarged views in FIGS. 9A and 9B and FIGS. 12A and 12B); the bracket 804 is a rail-mount bracket 804 with a tapered or varied thickness (also depicted in an enlarged view in FIG. 10 and also referred to as a "varied-thickness rail-mount bracket"); and the bracket 806 is a rail-mount bracket with a non-varied or uniform thickness (also depicted in an enlarged view in FIGS. 11A and 11B).

Referring to FIG. 8B, the chassis rails 102 and 104 can include features or elements that change the transverse rail position (e.g., relative to a transverse midline 834) of the sidewall 810 at different positions along the chassis rails 102 and 104. For example, the chassis rail 102 can include, at rail segment 826, a bend 827 (see enlarged view in FIG. 8B) or other surface deviation that transitions between a first rail segment 828 (e.g., fore segment) and a second rail segment 830 (e.g., aft segment). Referring to FIG. 8B, the segment

828 (e.g., a sidewall surface associated with the segment) includes a transverse rail position 832 (e.g., based on the surface 846 in the enlarged view) that is farthest away from a transverse midline 834 (e.g., relative to the segments 826 and 830). As depicted, the segment 826 (e.g., a sidewall surface associated with the segment) can include a transverse rail position 836 (e.g., based on the surface 842 in the enlarged view) that is closer (as compared to the transverse position 832) to the transverse midline 834; and the segment 830 (e.g., a sidewall surface associated with the segment) can include a transverse rail position 838 that is closest (as compared to both transverse positions 832 and 836) to the transverse midline 834. In at least some examples, the rail segment 826 includes the surface 842 or sidewall (e.g., see enlarged view depicted as part of FIG. 8B) that extends at least partially in a plane 843 at an angle 844 relative to a plane 845 in which the surface 846 or sidewall of the segment 828 at least partially extends. In examples, the rail-mount brackets 802, 804, 806, and 808 can, as described in more detail below, include structures or other elements to account for the variable sidewall transverse positions 832, 836, and 838 when providing a consistent transverse mounting position 840 for multiple of the mounting locations 820, 822, and/or 824.

FIGS. 9A (perspective) and 9B (top down) depict an enlarged view of the angled rail-mount bracket 802, in accordance with an example. The angled rail-mount bracket 802 can include a first portion 902 (e.g., plate or wall of the bracket 802) and a second portion 904 (e.g., plate or wall of the bracket 802). The second portion 904 can extend at an angle 920 from the first portion 902, and in some examples, the angle 920 formed by the first portion 902 and the second portion 904 is in a range of about 135 degrees to about 75 degrees, or in some examples between about 105 degrees and 75 degrees, or in some examples about 90 degrees. Also, in examples, the first portion 902 includes one or more fastener openings or apertures 906 to receive a fastener for attachment to the chassis rail 102. In addition, the first portion 902 can include one or more fastener openings 908 to receive a fastener for attachment to an isolator 910. As used herein, the term "isolator" can include a device or structure that functions to provide a connection between two components, while also isolating the components from each other in some respects. In some examples, an isolator can dampen vibration or other motion between components, and in this respect, the isolator can "isolate" (at least partially) vibration or motion of one component (e.g., the vehicle and/or a chassis rail) from another component (e.g., a power supply module). In some examples, an isolator can include metal, rubber, polymers, or any combination thereof.

Further, in some examples, the first portion 902 can include a thickness dimension 912 measured between a plane of a first surface 914 (e.g., configured to face or abut the rail sidewall 810 when the bracket 802 is mounted to the rail) and a plane of a second surface 916 configured to attach to (e.g., abut) the isolator 910. Among other things, the thickness dimension 912 can contribute to the consistent transverse mounting position 840 (e.g., consistent among the various different brackets and relative to the chassis rail having a sidewall with a varied transverse position). Also, in at least some examples, the second portion 904 can include one or more fastener openings 913 to receive fasteners for attachment to an impact-protection support member (e.g., such as mounting bracket 160 in FIG. 1, which is configured to couple a side-impact protector 162 (FIG. 1) to the chassis rail 102. Furthermore, one or more of the openings 906, 908, and/or 912 can include cast reinforcement walls (e.g., 914) to increase strength and load bearing capacity.

FIG. 10 depicts an enlarged view of the varied-thickness, rail-mount bracket 804, in accordance with an example, and in describing the varied-thickness, rail-mount bracket 804, reference is also made to the varied-thickness, rail-mount bracket 804 in the enlarged and partially disassembled view of FIG. 8B. The varied-thickness, rail-mount bracket 804 can include a first portion 1002 (e.g., plate or wall of the bracket 804), a second portion 1004 (e.g., plate or wall of the bracket 804), and a third portion 1005 connecting (e.g., bridging between) the first portion 1002 and the second portion 1004. In examples, the first portion 1002, the second portion 1004, and the third portion 1005 can include one or more fastener openings or apertures 1006a, 1006b, and 1006c to receive a fastener for attachment to the chassis rail. In addition, the first portion 1002 and the second portion 1004 can include one or more fastener openings 1008a and 1008b to receive a fastener for attachment to isolators 1010a and 1010b. In one example, the first portion 1002 and the first isolator 1010a can (in combination with the bracket 802 and the isolator 910) provide part of the mounting position 820, and the second portion 1004 and the second isolator 1010b can provide part of the mounting position 822.

In at least some examples, the first portion 1002 can include a first thickness dimension 1012 (e.g., thickness 850 in FIG. 8B) extending between a first-portion first surface 1014 (e.g., configured to face towards or abut the rail sidewall 810, such as the surface 846 (sidewall) when the bracket 804 is mounted to the rail) and a first-portion second surface 1016, which can abut the isolator 1010a when the isolator 1010a is coupled to the first portion 1002. When determining the thickness dimension 1012, in at least one example, the thickness dimension 1012 can be determined based on a first reference plane in which the first-portion first surface 1014 is positioned and a second reference plane in which the first-portion second surface 1016 is positioned, and is measured from the first reference plane to the second reference plane and normal to the second reference plane. In at least some examples, the thickness 1012 is similar to the thickness 912.

In examples, the second portion 1004 can include a second thickness 1018 (e.g., thickness dimension 852 in FIG. 8B) that is larger than the first thickness 1012 (e.g., 850) and that extends between a second-portion first surface 1020 (e.g., configured to face towards and abut the rail sidewall 810 when the bracket 804 is mounted to the rail, such as the sidewall 842 when the bracket 804 is mounted to the rail) and a second-portion second surface 1022, which can abut the isolator 1010b when the isolator 1010b is coupled to the second portion 1004. In at least some examples, bracket 804 can gradually transition from the first thickness 1012 to the second thickness 1018. For example, the first portion 1002 can include a relatively uniform thickness, and at or after the third portion 1005, the second portion 1004 can gradually increase in thickness as the bracket 804 extends from the center portion 1005 to a terminal end of the second portion 1004. In some examples, referring to FIG. 8B, the first-portion first surface (e.g., mounting portions formed therewith and configured to abut the surface 846) can extend at an angle 854 relative to the second-portion first surface (e.g., mounting portions formed therewith and interfacing with the surface 842), and the angle 854 can be similar or congruent to the angle 844.

In examples, the variation in sizes between the first thickness 1012 and the second thickness 1018 can help account for variations in the transverse rail positions 832 and 836 of the sidewall 810. Further, in some examples, the angular orientation of the first-portion first surface 1014 relative to the second-portion first surface 1020 can account for the angle 844 of the surfaces 842 and 846. For example, the center portion 1005 can attach to the chassis rail 102 at or near a transition from the rail segment 828 to the rail segment 826. As such, even though the segment 826 can include a transverse position 836 that is closer (as compared to the transverse position 832 of the segment 828) to the transverse midline 834, the variation in sizes between the thickness dimensions 1012 and 1018 (and/or the relative angular orientation of the surfaces 1014 and 1020) contributes to the consistent transverse mounting position 840.

FIGS. 11A (perspective) and 11B (top down) depict an enlarged view of the rail-mount bracket 806, in accordance with an example. The rail-mount bracket 806 can include a first portion 1102 (e.g., plate or wall of the bracket 806), a second portion 1104 (e.g., plate or wall of the bracket 806), and a third portion 1105 connecting (e.g., bridging between) the first portion 1102 and the second portion 1104. In examples, the first portion 1102, the second portion 1104, and the third portion 1105 can include one or more fastener openings or apertures 1106a, 1106b, and 1106c to receive a fastener for attachment to the chassis rail. In addition, the first portion 1102 and the second portion 1104 can include one or more fastener openings 1108a and 1108b to receive a fastener for attachment to isolators 1110a and 1110b. In one example, the first portion 1102 and the first isolator 1110a can (in combination with the bracket 804 and the isolator 1010b) provide part of the mounting position 822, and the second portion 1104 and the second isolator 1110b can provide part of the mounting position 824.

In at least some examples, the first portion 1102 and the second portion 1104 can include a thickness dimension 1112a and 1112b extending between one or more first surfaces 1114a and 1114b (e.g., co-planar surfaces configured to face towards or abut the rail sidewall 810 when the bracket 806 is mounted to the rail) and one or more second surfaces 1116a and 1116b, which can abut the isolators 1110a and 1110b when the isolators 1110a and 1110b are coupled to the first portion 1102 and the second portion 1104. When determining the thickness dimensions 1112a and 1112b, in at least one example, the thickness dimensions 1112a and 1112b can be determined based on a first reference plane in which the first surfaces 1114a and 1114b are positioned and a second reference plane in which the second surfaces 1116a and 1116b are positioned, and is measured from the first reference plane to the second reference plane and normal to the second reference plane. In at least some examples, the thickness dimension 1112a in the first portion 1102 is substantially consistent with the thickness dimension 1112b in the second portion 1104. In some examples, to help account for variations in the transverse rail positions 832, 836, and 838 of the sidewall 810, the thickness dimensions 1112a and 1112b can be larger than the thickness dimensions 912, 1012, and 1018. As such, even though the segment 830 can include a transverse rail position 838 that is closest (as compared to the transverse position 832 of the segment 828 and the transverse position 836 of the segment 826) to the transverse midline 834, the larger thickness dimensions 1112a and 1112b can contribute to the consistent transverse mounting position 840.

FIGS. 12A (perspective) and 12B (top down) depict an enlarged view of the angled rail-mount bracket 808, in accordance with an example. In some instances, the angled rail-mount bracket 808 can include at least some features that are similar to the angled rail-mount bracket 802, such as a first portion 1202 (e.g., plate or wall of the bracket 808) and a second portion 1204 (e.g., plate or wall of the bracket 808). The second portion 1204 can extend at an angle 1220 from the first portion 1202, and in some examples, the angle 1220 formed by the first portion 1202 and the second portion 1204 is in a range of about 135 degrees to about 75 degrees, or in some examples between about 105 degrees and 75 degrees, or in some examples about 90 degrees.

Also, in examples, the first portion 1202 can include one or more fastener openings or apertures 1206 to receive a fastener for attachment to the chassis rail. In addition, the first portion 1202 can include one or more fastener openings 1208 to receive a fastener for attachment to an isolator 1210. In an example, the first portion 1202 and the isolator 1210 can (in combination with the second portion 1104 of the bracket 806 and the isolator 1110b) provide part of the mounting position 824. Also, in at least some examples, the second portion 1204 can include one or more fastener openings 1222 to receive fasteners for attachment to a mounting bracket 164 (FIG. 1) for coupling the side-impact protector 162 (FIG. 1) to the chassis rail 102.

In at least some examples, the first portion 1202 can include a thickness dimension 1212 measured between a plane of a first surface 1214 (e.g., configured to face or abut the rail sidewall 810 when the bracket 808 is mounted to the rail) and a plane of a second surface 1216 configured to attach to (e.g., abut) the isolator 1210. In some examples, to help account for variations in the transverse positions 832, 836, and 838 of the sidewall 810, the thickness dimension 1212 can be similar to the thickness dimensions 1112a and 1112b (and larger than the thickness dimensions 912, 1012, and 1018). As such, even though the segment 830 can include a transverse position 838 that is closest (as compared to the transverse position 832 of the segment 828 and the transverse position 836 of the segment 826) to the truck transverse midline 834, the larger thickness dimension 1212 can contribute to the consistent transverse mounting position 840.

Figure 13:
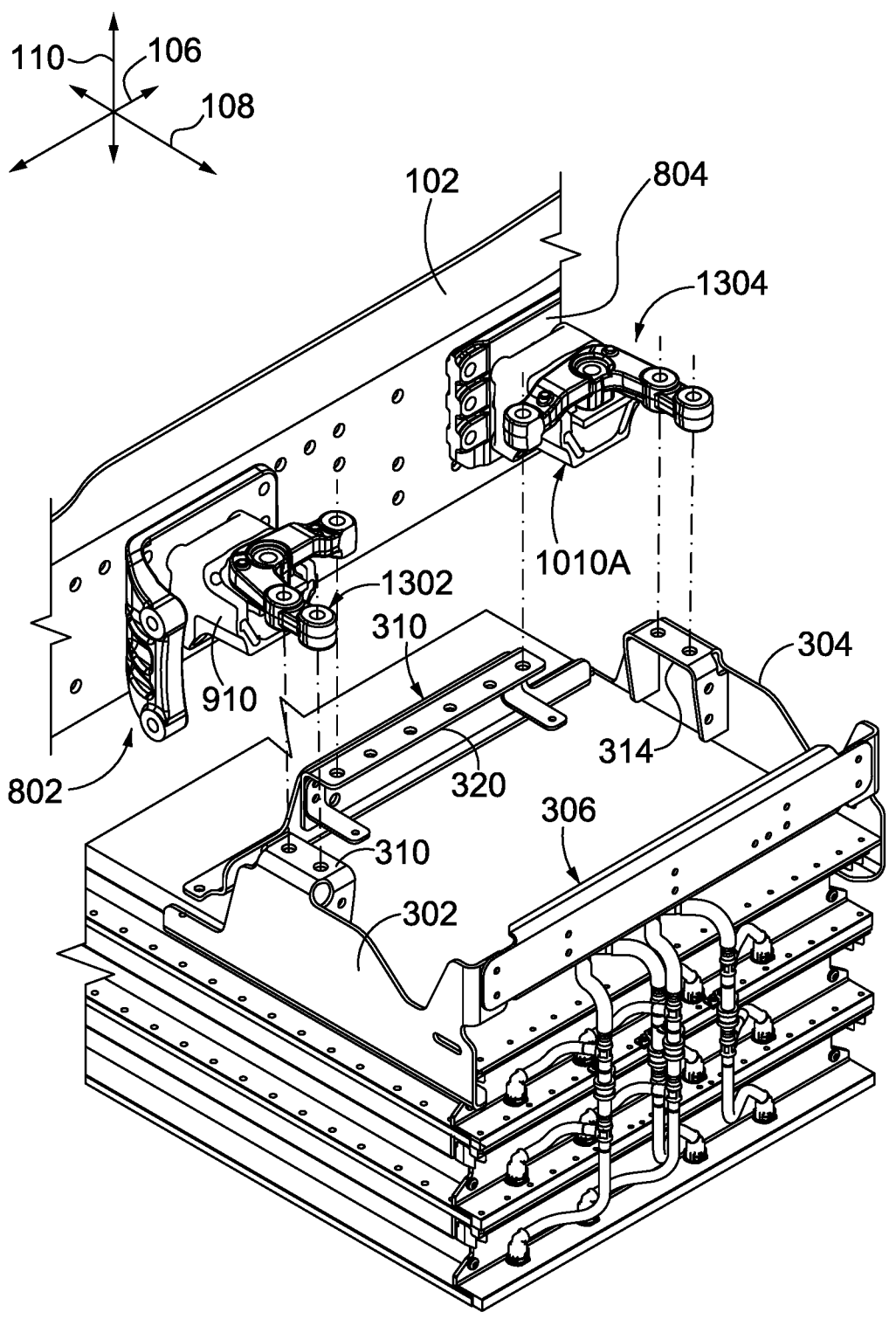
FIG. 13 depicts connector brackets for securing mounting brackets (e.g., preassembled on the power supply-module stack) and rail-mount brackets (e.g., preassembled on the chassis rail), in accordance with an example of this disclosure.

In at least some examples, brackets (e.g., 302, 304, 306, and 308) of the one or more various mounting assemblies may be preassembled to the power supply module or power supply-module stack (e.g., 120) before being installed on the vehicle 100. For example, referring to FIG. 13, the side brackets 302 and 304, the end bracket 306, and the inboard bracket 308 are preassembled to the power supply-module stack 120, and a similar preassembly can be performed with respect to the stacks 122 and 124 (as well as the right sides of the stacks 120, 122, and 124). In addition, the appropriate rail-mount brackets can be preassembled to the chassis rail 102. For example, in FIG. 13, the angled rail-mount bracket 802 and the varied-thickness rail-mount bracket 804 are fastened to the chassis rail 102. In some examples, the power supply-module stack 120 preassembled with the brackets 302, 304, 306, and 308 can be positioned directly beneath the chassis rail 102, which is preassembled with the brackets 802 and 804. In examples, the power supply-module stack 120 can be lifted or raised (e.g., via the hoist brackets 330 obscured from view in FIG. 13), such that the top portions 310 and 314 of the side brackets 302 and 304 are positioned near (e.g., partially outboard of in the transverse orientation) the isolators 910 and 1010a and the upper flange 320 of the inboard bracket 308 is positioned between the isolators 910 and 1010a. The side and inboard mounting brackets 302, 304, and 308 can then be affixed to the chassis rail 102, such as via the first and second connector brackets 1302 and 1304 (described in more detail below). In examples, the mounting assembly and related method(s) of attachment of the present disclosure can allow for more efficient vehicle assembly (e.g., decrease tack time), based on the manner in which the mounting assembly can be pre-assembled to the vehicle and lifted vertically from beneath the chassis for attachment to the vehicle (e.g., as opposed to having to both vertically lift and horizontally traverse or slide the power supply modules).

At least some examples of the disclosure include a first connector bracket 1302 (also depicted in more detail in FIGS. 14A, 14B, and 14C) that attaches (via fasteners) to the side bracket 302 (e.g., to the top portion 310), to the isolator 910, and to the inboard bracket 308 (e.g., to the upper flange 320). Examples also include a second connector bracket 1304 that attaches (via fasteners) to the side bracket 304 (e.g., to the top portion 314), to the isolator 1010a, and to the inboard bracket 308 (e.g., to the upper flange 320). As such, the connector brackets 1302 and 1304 operate to tie the mounting brackets 302, 304, and 308 to the chassis rail 102 (e.g., by way of the isolators 910 and 1010a). When referencing FIGS. 14A, 14B, and 14C, the connector bracket 1302 is discussed, and a similar description can apply to the connector bracket 1304 (e.g., as a mirror image).

Figures 14A, 14B, 14C:
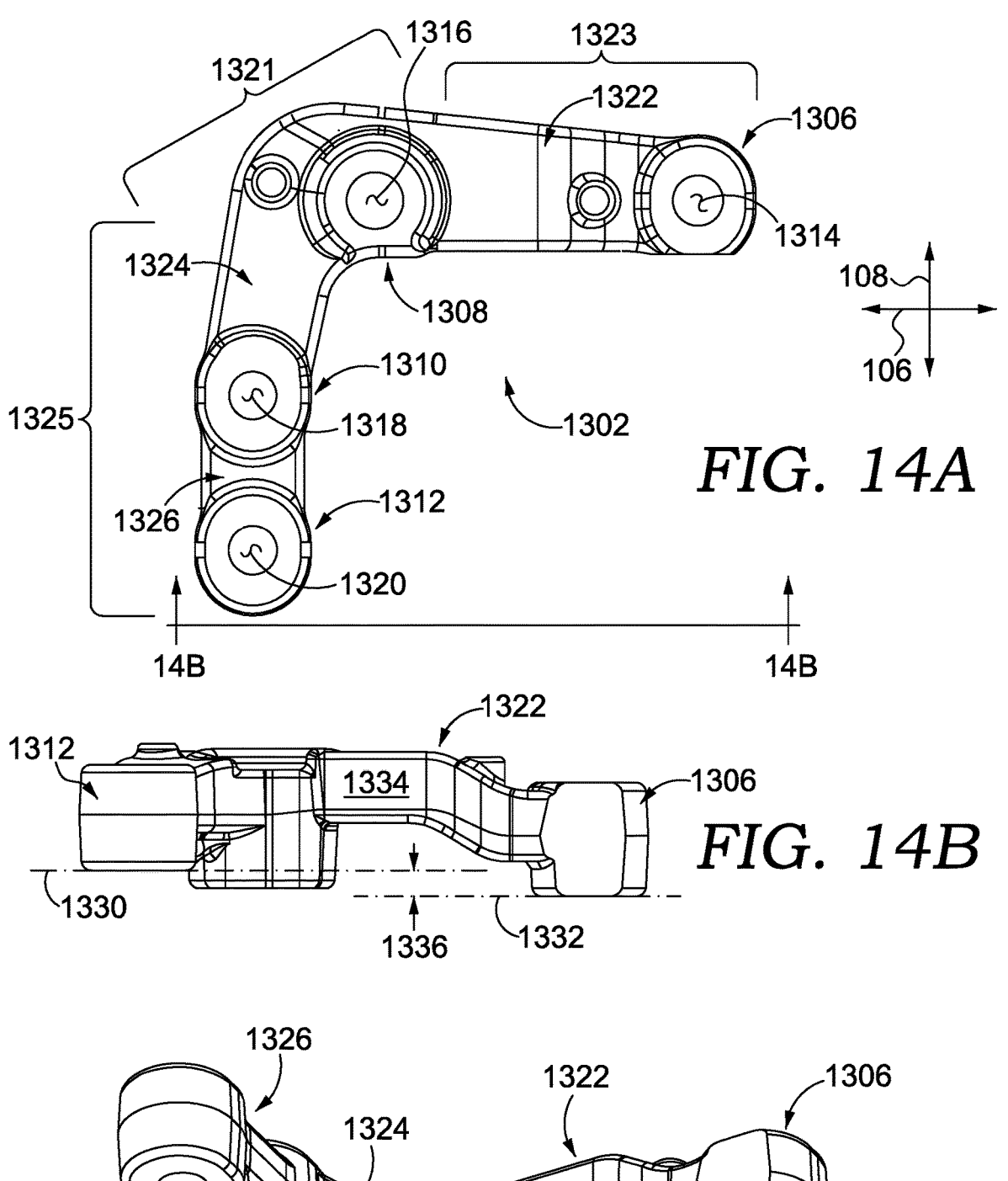
FIGS. 14A through 14C depict various views of a connector bracket, in accordance with an example of this disclosure.

In general, and referring to FIGS. 14A, 14B, and 14C, the connector bracket 1302 includes a plurality of knuckles 1306, 1308, 1310, and 1312, which include fastener-receiving apertures, 1314, 1316, 1318, and 1320 (e.g., holes, eyes, etc.), respectively. In addition, the knuckles 1306, 1308, 1310, and 1312 are positionally fixed relative to one another by rigid linking members 1322, 1324, and 1326, and in some examples, the knuckles 1306, 1308, 1310, and 1312 and rigid linking members 1322, 1324, and 1326 can be cast as an integrally formed structure. In examples, the knuckles 1306, 1308, 1310, and 1312 and rigid linking members 1322, 1324, and 1326 collectively form a central portion 1321, a first arm 1323, and a second arm 1325. In addition, the first arm 1323, when assembled to the vehicle, can generally extend in the longitudinal orientation 106 (e.g., substantially parallel to the chassis rails), and the second arm 1325, when assembled to the vehicle, generally extends in the transverse orientation 108 (i.e., substantially perpendicular to the chassis rails).

In examples, the fastener-receiving aperture 1314 can be aligned with a hole in the upper flange 320 and a fastener can be inserted to connect the connector bracket 1302 to the inboard bracket 308 by way of the knuckle 1306. In addition, the fastener-receiving aperture 1316 can be aligned with a hole in the isolator 910 and a fastener can be inserted to connect the connector bracket 1302 to the isolator 910 by way of the knuckle 1308. Further, the fastener-receiving apertures 1318 and 1320 can be aligned with holes in the top portion 310, and fasteners can be inserted to connect the connector bracket 1302 to the side bracket 302 by way of the knuckles 1310 and 1312.

The connector bracket 1302 can include various other elements. In some examples, a portion 1328 of the knuckle 1308 that interfaces with the isolator 910 can include a size and shape (e.g., cross-sectional shape or profile) configured to nest into a recess or other feature on a top surface of the isolator 910. In some instances, the portion 1328 can include one or more relatively flat sides or edges that resist rotation when nested into the corresponding shape on the top of the isolator 910 (e.g., a keyed relationship). Among other things, this nesting relationship can reduce movement between the components, help align the fastener-receiving aperture 1316 of the connector bracket 1302 with the isolator fastener hole, and increase the snugness of the fit between the connector bracket 1302 and the isolator 910.

In some examples, the connector bracket 1302 can be configured to bridge the offset 406 (FIG. 4B) between the side bracket 302 and the inboard bracket 308. That is, in some examples, the upper extent of the top portion 310 (e.g., that fastens to the connector bracket 1302) is relatively higher than the upper extent of the upper flange 320 (e.g., that also fastens to the connector bracket 1302), and the connector bracket 1302 can be configured to bridge that positional/vertical difference. For instance, in examples, the lower extent of the knuckles 1310 and 1312 (e.g., reference line 1330 in FIG. 14B indicates the lower extent of the knuckles 1310 and 1312) that are configured to connect to (e.g., abut) the top portion 310 can be relatively higher than the lower extent of the knuckle 1306 (e.g., reference line 1332 in FIG. 14B indicates the lower extent of the knuckle 1306), which is configured to connect to (e.g., abut) the upper flange 320. The rigid linking member 1322 can include an angled portion 1334 with one or more bends that move the lower extent of the knuckle 1306 into a different/lower horizontal plane (e.g., normal to the drawing sheet and co-extensive with 1332). In examples, the lower extent of the knuckles 1310 and 1312 is vertically offset from the lower extent of the knuckle 1306 by a distance 1336. In at least some examples, the distance 1336 is substantially similar to the offset 406 (e.g., within standard manufacturing tolerances).

In examples, the connector brackets 1302 and 1304 are configured to tolerate various stresses and limit movement of the power supply-module stacks in various orientations. For example, when a vehicle is at rest, a compressive load can be transferred to the knuckles 1306, 1308, 1310, and 1312 arising from the connection of the fasteners though the fastener-receiving eyes and to the mounting brackets. That is, as the power supply-module stacks pull vertically downward, a compressive load can be transferred at least partially to the knuckles. Further, in some examples, such as when the vehicle is accelerating, braking, and turning, other loads (e.g., torsional, tensional, and bending) can also be at least partially transferred to the connector brackets 1302 and 1304 associated with the connection to the power supply-module stacks. In examples, at least in part based on the connector brackets 1302 and 1304 including arms 1323 and 1325 extend in both the longitudinal orientation 106 and the transverse orientation 108, the connector brackets 1302 and 1304 can (by receiving the transferred torsional, tensional, and bending stresses) reduce the likelihood that the power supply-module stacks will yaw (e.g., side-to-side on the vertical axis).

In examples, similar assembly can be executed for the mounting brackets on the right side 118 of the vehicle 100 and in association with the other chassis rail 104. In addition, this assembly (e.g., on the left and right sides) can be performed for any number of power supply-module stacks. In some examples, and as mentioned in other portions of the disclosure, by securing the power supply module below the chassis rail, the mounting assembly of the present disclosure makes space above the power supply module available for the arrangement of other components, such as power-related components (e.g., power electronics, lines, etc.). For example, referring to FIG. 15, once the power supply-module stack 120 is mounted at least partially below the chassis rail 102, a volume of space 1502 can be open above the power supply-module stack 120 and at least partially enclosed by the brackets 302, 304, 306, and 308.

In some examples, the at least partially enclosed space 1502 can be configured to house and support other power-related components that operate in conjunction with the power supply modules, such as power electronics, lines (e.g., plumb lines, power cables), etc. For instance, one or more power electronics 1504 and 1506 can mount or attach to or near the brackets 302, 304, 306, and 308. In examples, one or more brackets 1508 and 1510 can attach to and/or extend from the inboard bracket 308 (e.g., brackets 1508 and 1510 can be considered part of the inboard bracket). In addition, one or more mounting surfaces (e.g., ledge, lip, or flange) can extend from an inward facing surface or edge (obscured from view based on the viewing angle in FIG. 15) of the end bracket 306. In some examples, a platform bracket 1512 can attach to the brackets 1508 and 1510 and to the mounting surface of the end bracket 306, and the power electronics 1504 and 1506 can be supported atop (e.g., secured to) the platform bracket 1512. As such, examples of the present disclosure can mount the power supply module in a confined space with volume restrictions, such as within the wheel base of the vehicle, while also creating space for other components to be housed or associated with the vehicle.

At least some examples of the present disclosure are related to method for mounting a power supply module to a vehicle, such as when manufacturing the vehicle or for retrofitting a vehicle. The method can include preassembling one or more mounting brackets (e.g., 302, 304, 306, 308, 602, 604, or 606) of a mounting assembly to top portion of a power supply module or power supply-module stack. In addition, one or more rail-mount brackets (e.g., 802-809) and respective isolators can be fastened to one or more rails of the vehicle. As part of preassembling the rail-mount brackets, a connector bracket (e.g., 1302 and 1304) can also be fastened to the isolators. For example, the portion 1328 can be seated in the corresponding recess of the isolator and a fastener (e.g., bolt) affixed through the aligned holes. In some examples, the power supply module or power supply-module stack (e.g., with the preassembled bracket(s)) can be positioned at least partially beneath the rail(s) (e.g., with the fastened rail-mount brackets) and aligned (e.g., in the longitudinal direction) with a mounting position (e.g., 820, 822, and 824).

Further, the power supply module or power supply-module stack can be lifted (e.g., via a hoisting device hooked to the hoisting bracket(s) 330) in a substantially vertical direction to a height at which the inboard bracket (e.g., 308) is between two isolators of the mounting position and/or the side brackets (e.g., 302 and 304) are outboard of the two isolators. In some examples, when the connector brackets (e.g., 1302 and 1304) are preinstalled on the isolators, the connector brackets can provide a position to which the brackets are lifted. That is, the power supply module(s) can be lifted until the side brackets and inboard brackets contact the connector brackets. With the power supply module or power supply-module stack lifted to the height and the side and inboard brackets aligned with the connector brackets, the connector brackets can be fastened to the side and inboard brackets. For example, fasteners can be inserted and torqued in a prescribed order to affix the connector brackets to the side brackets and to the inboard bracket. As previously described, this mounting procedure can be performed on both the right side and the left side (e.g., both rails 102 and 104) to mount the power supply module(s) in position.

Example Clauses

A. A vehicle comprising a chassis rail extending in a longitudinal orientation of the vehicle; a power supply module positioned at least partially beneath the chassis rail, the power supply module comprising a top portion oriented towards the chassis rail, a forward side that is oriented towards a front of the vehicle and that comprises a first overhang, and a rearward side that is oriented towards a rear of the vehicle and that comprises a second overhang; and a mounting assembly attaching the power supply module to the chassis rail, the mounting assembly comprising: a first rail-mount bracket and a second rail-mount bracket, both coupled to the chassis rail; a first isolator coupled to the first rail-mount bracket and a second isolator coupled to the second rail-mount bracket; a first side bracket comprising a first flange that attaches beneath the first overhang; a second side bracket comprising a second flange that attaches beneath the second overhang; an inboard bracket coupled to the top portion of the power supply module; a first connector bracket coupled to the first isolator, the first side bracket, and the inboard bracket; and a second connector bracket coupled to the second isolator, the second side bracket, and the inboard bracket.

B. The vehicle of Clause A, wherein: the mounting assembly further comprises an end bracket coupled to the first side bracket and the second side bracket; and the vehicle further comprises a power-electronics device coupled to at least one of the end bracket or the inboard bracket.

C. The vehicle of any of Clauses A through B, wherein: the mounting assembly further comprises an end bracket coupled to the first side bracket and the second side bracket; and the end bracket comprises a charging-port interface configured to connect to a charging port.

D. The vehicle of any of Clauses A through C, wherein: the first rail-mount bracket comprises a first portion coupled to the chassis rail and a second portion extending at an angle relative to the first portion; the isolator is coupled to the first portion of the rail-mount bracket; and the vehicle further comprises an impact-protection support member coupled to the second portion of the rail-mount bracket.

E. The vehicle of any of Clauses A through D, wherein: the first connector bracket comprises a first arm extending in the longitudinal orientation and a second arm extending in a transverse orientation; the first arm attaches to an upper flange of the inboard bracket; and the second arm attaches to a top portion of the first side bracket.

F. The vehicle of any of Clauses A through E, wherein the mounting assembly further comprises a hoist bracket coupled to the first side bracket or the second side bracket, the hoist bracket comprising an aperture configured to receive a portion of a lifting apparatus.

G. A mounting assembly for attaching a power supply module at least partially beneath a vehicle chassis rail, the mounting assembly comprising: a rail-mount bracket attachable to the chassis rail; an isolator attachable to the rail-mount bracket; a side bracket comprising a flange that is attachable underneath an overhang of the power supply module; an inboard bracket attachable to a top portion of the power supply module; a connector bracket attachable to the isolator, the side bracket, and the inboard bracket.

H. The mounting assembly of Clause G, wherein the rail-mount bracket comprises: a first portion configured to attach to the chassis rail and a second portion extending at an angle relative to the first portion; the isolator is attachable to the first portion of the rail-mount bracket; and the second portion of the rail-mount bracket is attachable to an impact-protection support member.

I. The mounting assembly of any of Clauses G through H, wherein: the mounting assembly further comprises a second isolator; and the rail-mount bracket comprises: a first portion configured to attach to the chassis rail and to the isolator; and a second portion configured to attach to the chassis rail and to a second isolator.

J. The mounting assembly of any of Clauses G through I, wherein: the first portion comprises a first thickness dimension between a first surface configured to face the chassis rail and a second surface configured to face the isolator; and the second portion comprises a second thickness dimension that is between a third surface configured to face the chassis rail and a fourth surface configured to face the second isolator and that is different than the first thickness dimension.

K. The mounting assembly of any of Clauses G through J further comprising: a second side bracket comprising a second flange that is attachable underneath a second overhang of the power supply module; and an end bracket attachable to the first side bracket and the second side bracket at an angle relative to the flange and the second flange, wherein the angle is an acute angle.

L. The mounting assembly of any of Clauses G through K, wherein: the mounting assembly further comprises an end bracket attachable to the side bracket; the end bracket comprises a flange configured to connect to, and load support, a power-electronics device; and the inboard bracket is configured to connect to, and load support, the power-electronics device.

M. The mounting assembly of any of Clauses G through L, wherein: the connector bracket comprises: a first arm that extends in a first orientation and that is attachable to the inboard bracket; and a second arm that extends in a second orientation perpendicular to the first orientation and that is attachable to the side bracket.

N. The mounting assembly of any of Clauses G through M, wherein: the connector bracket comprises: a first surface that extends in a first reference plane and that is configured to abut the inboard bracket when the connector bracket is attached to the inboard bracket; and a second surface that extends in a second reference plane and that is configured to abut the side bracket when the connector bracket is attached to the side bracket; and the first reference plane and the second reference plane are offset by a first offset distance configured to bridge a second offset distance associated with the inboard bracket and the side bracket.

O. A vehicle comprising: a chassis rail extending in a longitudinal orientation of the vehicle; a first power supply module positioned at least partially beneath the chassis rail, the first power supply module comprising a first side that is oriented towards a front of the vehicle or a rear of the vehicle and that comprises a first overhang; a second power supply module positioned at least partially beneath the chassis rail and rearward of the first power supply module, the second power supply module comprising a second side that is oriented towards the front of the vehicle or the rear of the vehicle and that comprises a second overhang; a first mounting assembly attaching the first power supply module to the chassis rail, wherein the first mounting assembly comprises a first mounting bracket comprising a first flange that attaches beneath the first overhang; and a second mounting assembly attaching the second power supply module to the chassis rail, wherein the second mounting assembly comprises a second mounting bracket comprising a second flange that attaches beneath the second overhang.

P. The vehicle of Clause O further comprising, a rail-mount bracket coupled to the chassis rail, wherein the rail-mount bracket comprises: a first portion coupled to a first isolator, which attaches to the first mounting bracket; and a second portion coupled to a second isolator, which attaches to the second mounting bracket.

Q. The vehicle of Clause P, wherein: the first portion comprises a first thickness dimension between a first surface configured to face the chassis rail and a second surface configured to face the first isolator; and the second portion comprises a second thickness dimension that is between a third surface configured to face the chassis rail and a fourth surface configured to face the second isolator and that is different than the first thickness dimension.

R. The vehicle of Clause P further comprising: a first connector bracket that attaches to the first isolator and the first mounting bracket; and a second connector bracket that, independent of the first connector bracket, attaches to the second isolator and the second mounting bracket.

S. The vehicle of any of Clauses O through S, wherein: the first mounting bracket is a first side bracket and comprises a third flange for connecting to a first end bracket, the third flange being oriented at a first angle with respect to the first flange; the second mounting bracket is a second side bracket and comprises a fourth flange for connecting to a second end bracket, the fourth flange being oriented at a second angle with respect to the second flange; and the first angle is larger than the second angle.

T. The vehicle of any of Clauses O through S, wherein: the vehicle further comprises a power component electrically connected to at least one of the first power supply module or the second power supply module; the first mounting bracket comprises a first cutout configured to receive a first portion of the power component; the second mounting bracket comprises a second cutout configured to receive a second portion of the power component; and the power component, when received in the first cutout and the second cutout, spans across at least a portion of the first mounting assembly and at least a portion of the second mounting assembly.

AA. A vehicle comprising: a chassis rail extending in a longitudinal orientation of the vehicle and comprising a first rail portion associated with a first transverse rail position and a second rail portion associated with a second transverse rail position, wherein the second transverse rail position is closer, relative to the first transverse rail position, to a midline of the vehicle; rail-mount brackets associated with a first battery mounting location relative to the chassis rail and a second battery mounting location relative to the chassis rail, the rail-mount brackets comprising: a first rail-mount bracket comprising a first wall that is associated with a first thickness dimension and that is attached to the first rail portion associated with the first transverse rail position, wherein, based at least in part on the first thickness dimension, the first battery mounting location includes a first transverse mounting position; and a second rail-mount bracket comprising a second wall that is associated with a second thickness dimension and that is attached to the second rail portion associated with the second transverse rail position, wherein the second thickness is larger than the first thickness, and, based at least in part on the second thickness dimension, the second battery mounting location includes a second transverse mounting position, which is longitudinally aligned with the first transverse mounting position; a first power supply module and a second power supply module positioned at least partially below the chassis rail; first mounting brackets that, via at least the first rail-mount bracket, mount the first power supply module to the chassis rail at the first battery mounting location; and second mounting brackets that, via at least the second rail-mount bracket, mount the second power supply module to the chassis rail at the second battery mounting location.

BB. The vehicle of Clause AA, wherein: the chassis rail comprises a third rail portion associated with a third transverse rail position that is closer, relative to the second transverse rail position, to the midline of the vehicle; the rail-mount brackets comprise a third rail-mount bracket comprising a third wall that is associated with a third thickness dimension and that is attached to the third rail portion associated with the third transverse rail position; and the third thickness is larger than the second thickness and, based at least in part on the third thickness dimension, the second battery mounting location includes the second transverse mounting position longitudinally aligned with the first transverse mounting position.

CC. The vehicle of any of Clauses AA through BB, wherein: the second rail-mount bracket comprises a third wall that is associated with a third thickness dimension and that is attached to the first rail portion, wherein the third thickness is substantially similar to the first thickness dimension; and the second rail-mount bracket includes a change in thickness dimensions between the second thickness dimension and the third thickness dimension.

DD. The vehicle of any of Clauses AA through CC, wherein: the chassis rail comprises a third rail portion associated with a third transverse rail position; the rail-mount brackets are associated with a third battery mounting location relative to the chassis rail; the rail-mount brackets comprise a third rail-mount bracket comprising a third wall that is associated with a third thickness dimension and that is attached to the third rail portion associated with the third transverse rail position; and the third thickness is larger than the second thickness, and, based at least in part on the third thickness dimension, the third battery mounting location includes a third transverse mounting position, which is longitudinally aligned with the first transverse mounting position and the second transverse mounting position.

EE. The vehicle of any of Clauses AA through DD, wherein the first rail-mount bracket comprises a third wall that is oriented at an angle relative to the first wall and that attaches to a mounting bracket for supporting a side impact protector.

FF. The vehicle of any of Clauses AA through EE, wherein: the chassis rail comprises a third rail portion associated with a third transverse rail position that is closer, relative to the second transverse rail position, to the midline of the vehicle; the rail-mount brackets comprise: a third rail-mount bracket comprising a third wall that is associated with a third thickness dimension and that is attached to the third rail portion associated with the third transverse rail position; and a fourth rail-mount bracket comprising a fourth wall that is associated with the third thickness dimension and that is attached to the third rail portion associated with the third transverse rail position; and the third rail-mount bracket and the fourth rail-mount bracket are associated with a third transverse mounting position, which is longitudinally aligned with the first transverse mounting position and the second transverse mounting position.

GG. An assembly for attaching a power supply module to a vehicle, the assembly comprising: a chassis rail comprising a sidewall; the sidewall comprising a first sidewall portion that is offset from a second sidewall portion by a distance; a first rail-mount bracket comprising a first wall that is associated with a first thickness dimension and that is configured to attach the first sidewall portion; and a second rail-mount bracket comprising a second wall that is associated with a second thickness dimension and that is configured to attach to the second sidewall portion, wherein a difference between the second thickness dimension and the first thickness dimension is equal to the distance.

HH. The assembly of any of Clause GG, wherein the first rail-mount bracket and the second rail-mount brackets are associated with a same mounting location at which a power supply module is mountable to the chassis rail.

II. The assembly of any of Clauses GG through HH, wherein: the first rail-mount bracket is associated with a first battery mounting location at which a first power supply module is mountable to the chassis rail, the first battery mounting location being associated with a first transverse mounting position; the second rail-mount bracket is associated with a second battery mounting location at which a second power supply module is mountable to the chassis rail, the second battery mounting location being different from the first battery mounting location and associated with a second transverse mounting position, which is longitudinally aligned with the first transverse mounting position.

JJ. The assembly of any of Clauses GG through II, wherein: the first rail-mount bracket includes a third wall that is oriented at a first angle relative to the first wall and that is configured to attach to a side impact protection assembly; and the second rail-mount bracket includes a fourth wall that is oriented at a second angle relative to the second wall and that is configured to attach to the side impact protection assembly.

KK. The assembly of any of Clauses GG through JJ, wherein: the second rail-mount bracket comprises a third wall that is associated with a third thickness dimension and that is attachable to the first sidewall portion, wherein the third thickness is substantially similar to the first thickness dimension; and the second rail-mount bracket includes a change in thickness dimensions between the second thickness dimension and the third thickness dimension.

LL. The assembly of any of Clauses GG through KK, further comprising: a second chassis rail comprising a second sidewall; the second sidewall comprising a third sidewall portion that is offset from a fourth sidewall portion by a second distance, wherein the third sidewall portion and the fourth sidewall portion mirror the first sidewall portion and the second sidewall portion; a third rail-mount bracket that mirrors the first rail mount bracket, that includes a third wall associated with a third thickness, and that is configured to attach to the third sidewall portion; and a fourth rail-mount bracket that mirrors the second rail mount bracket, that includes a fourth wall associated with a fourth thickness, and that is configured to attach to the fourth sidewall portion, wherein a difference between the third thickness and the fourth thickness is equal to the second distance.

MM. The assembly of any of Clauses GG through LL, wherein: the sidewall comprises a third sidewall portion that is offset from the second sidewall by a second distance; the rail-mount brackets comprise: a third rail-mount bracket comprising a third wall that is associated with a third thickness dimension and that is attachable to the third sidewall portion; and a fourth rail-mount bracket comprising a fourth wall that is associated with the third thickness dimension and that is attachable to the third sidewall portion; and a difference between the second thickness dimension and the third thickness dimension is equal to the second distance.

NN. An assembly for attaching a power supply module to a vehicle, the assembly comprising: a chassis rail comprising a sidewall; the sidewall comprising a first sidewall portion that is offset from a second sidewall portion by a distance; a first rail-mount bracket wall that is associated with a first thickness dimension and that is configured to attach the first sidewall portion; and a second rail-mount bracket wall that is associated with a second thickness dimension and that is configured to attach to the second sidewall portion, wherein a difference between the second thickness dimension and the first thickness dimension is equal to the distance.

OO. The assembly of Clause NN, wherein the first rail-mount bracket wall and the second rail-mount bracket wall are connected and comprise a varied thickness, rail-mount bracket.

PP. The assembly of any of Clauses NN through OO, wherein: the first rail-mount bracket wall comprises a first rail-mount bracket; and the second rail-mount bracket wall comprises a second rail-mount bracket.

QQ. The assembly of any of Clauses NN through PP, wherein: the first rail-mount bracket is associated with a first battery mounting location at which a first power supply module is mountable to the chassis rail, the first battery mounting location being associated with a first transverse mounting position; the second rail-mount bracket is associated with a second battery mounting location at which a second power supply module is mountable to the chassis rail, the second battery mounting location being different from the first battery mounting location and associated with a second transverse mounting position, which is longitudinally aligned with the first transverse mounting position.

RR. The assembly of any of Clauses NN through QQ, wherein: the first rail-mount bracket wall is connected to a third rail-mount bracket wall that is oriented at a first angle relative to the first rail-mount bracket wall and that is configured to attach to a side impact protection assembly; and the second rail-mount bracket wall is connected to a fourth rail-mount bracket wall that is oriented at a second angle relative to the second rail-mount bracket wall and that is configured to attach to the side impact protection assembly.

SS. The assembly of any of Clauses NN through RR, wherein: the sidewall comprises a third sidewall portion that is offset from the second sidewall by a second distance; the assembly further comprises a third rail-mount bracket wall that is associated with a third thickness dimension and that is attachable to the third sidewall portion; and a difference between the second thickness dimension and the third thickness dimension is equal to the second distance.

TT. The assembly of any of Clauses NN through SS, wherein: the first rail-mount bracket wall is configured to attach to a first battery isolator; and the second rail-mount bracket wall is configured to attach to a second battery isolator.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

This above detailed description is provided in order to meet statutory requirements. However, this description is not intended to limit the scope of the invention described herein. Rather, the claimed subject matter may be embodied in different ways, to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof.

The invention claimed is:

1. An assembly for mounting at least two power supply modules to a vehicle chassis, the assembly comprising:
a first rail-mount bracket, a second rail-mount bracket, and a third rail-mount bracket configured to be positioned between the first rail-mount bracket and the second rail-mount bracket on an outer face of a first chassis rail of the vehicle chassis;
a first side bracket configured to couple the first rail-mount bracket to a first overhang of a first power supply module, a second side bracket configured to couple the second rail-mount bracket to a second overhang of a second power supply module, a third side bracket configured to couple the third rail-mount bracket to a third overhang of the first power supply module, and a fourth side bracket configured to couple the third rail-mount bracket to a fourth overhang of the second power supply module;
a first inboard bracket configured to couple to a top portion of the first power supply module, to extend at least partially between the first side bracket and the third side bracket, and to couple to the first rail-mount bracket and to the third rail-mount bracket; and
a second inboard bracket configured to couple to a top portion of the second power supply module, to extend at least partially between the second side bracket and the fourth side bracket, and to couple to the second rail-mount bracket and to the third rail-mount bracket.

2. The assembly of claim 1, wherein the first rail-mount bracket is angled such that the first rail-mount bracket comprises a first portion for attachment to the first chassis rail, and a second portion that extends outward from the first chassis rail.

3. The assembly of claim 2, further comprising:
a side-impact protection component configured to be attached to the second portion of the first rail-mount bracket.

4. The assembly of claim 1, wherein:
the first rail-mount bracket comprises a first thickness dimension between a first face configured to face the outer face of the first chassis rail and a second face configured to face away from the outer face of the first chassis rail; and
the second rail-mount bracket comprises a second thickness dimension between a third face configured to face the outer face of the first chassis rail and a fourth face configured to face away from the outer face of the first chassis rail, the second thickness dimension being greater than the first thickness dimension.

5. The assembly of claim 1, wherein the third rail-mount bracket comprises third thickness dimension and a fourth thickness dimension between a fifth face configured to face the outer face of the first chassis rail and a sixth face configured to face away from the outer face of the first chassis rail; and wherein the third thickness dimension is smaller than the fourth thickness dimension.

6. The assembly of claim 1 further comprising,
a first vibration damper configured to couple to the first rail-mount bracket;
a second vibration damper configured to couple to the second rail-mount bracket; and
a third vibration damper and a fourth vibration damper configured to couple to the third rail-mount bracket.

7. The assembly of claim 6 further comprising,
a first connector bracket configured to couple to the first side bracket, to the first vibration damper, and to the first inboard bracket;
a second connector bracket configured to couple to the third side bracket, to the third vibration damper, and to the first inboard bracket;
a third connector bracket configured to couple to the fourth side bracket, to the fourth vibration damper, and to the second inboard bracket; and
a fourth connector bracket configured to couple to the second side bracket, to the second vibration damper, and to the second inboard bracket.

8. The assembly of claim 1 further comprising: a first end bracket configured to couple the first side bracket and the third side bracket and a second end bracket configured to couple the second side bracket to the fourth side bracket.

9. The assembly of claim 8, wherein the first end bracket and/or the second end bracket comprises a charging-port interface configured to connect to a charging port.

10. The assembly of claim 1, wherein one or more of the first side bracket, the second side bracket, the third side bracket, and the fourth side bracket comprises a hoist bracket comprising an aperture configured to receive a portion of a lifting apparatus.

11. The assembly of claim 1 further comprising:
a fourth rail-mount bracket, a fifth rail-mount bracket, and a sixth rail-mount bracket configured to be positioned between the fourth rail-mount bracket and the fifth rail-mount bracket on an outer face of a second chassis rail of the vehicle chassis; and a fifth side bracket configured to couple the fourth rail-mount bracket to a fifth overhang of the first power supply module, a sixth side bracket configured to couple the fifth rail-mount bracket to a sixth overhang of a second power supply module, a seventh side bracket configured to couple the sixth rail-mount bracket to a seventh overhang of the first power supply module, and an eighth side bracket configured to couple the sixth rail-mount bracket to an eight overhang of the second power supply module, wherein:

a combination of the first side bracket, the third side bracket, the fifth side bracket, and the seventh side bracket are configured to support the first power supply module on the first chassis rail and the second chassis rail; and a combination of the second side bracket, the fourth side bracket, the sixth side bracket, and the eighth side bracket are configured to support the second power supply module on the first chassis rail and the second chassis rail.

12. A vehicle comprising:

a chassis rail extending in a longitudinal orientation of the vehicle;

a power supply module positioned beneath the chassis rail, wherein a longitudinal orientation of the power supply module is substantially perpendicular to the longitudinal orientation of the vehicle;

a mounting assembly configured to couple the power supply module to the chassis rail by way of a first overhang and a second overhang of the power supply module, the first overhang positioned along a forward side of the power supply module oriented towards a front of the vehicle and the second overhang positioned along a rearward side of the power supply module oriented towards a rear of the vehicle;

a first rail-mount bracket, an inboard bracket coupled to the power supply module, a first side bracket coupled to the power supply module, and a first connector bracket coupled to the first rail-mount bracket, the first side bracket, and the inboard bracket.

13. The vehicle of claim 12, wherein the mounting assembly further comprises:

a second rail-mount bracket, a second side bracket coupled to the power supply module, and a second connector bracket coupled to the second rail-mount bracket, the second side bracket, and the inboard bracket.

14. The vehicle of claim 13, wherein:

the mounting assembly further comprises a first vibration damper coupled to the first rail-mount bracket and a second vibration damper coupled to the second rail-mount bracket; and the first connector bracket is coupled to the first rail-mount bracket by the first vibration damper and the second connector bracket is coupled to the second rail-mount bracket by the second vibration damper.

15. The vehicle of claim 12, wherein:

the first rail-mount bracket comprises a first portion coupled to the chassis rail and a second portion extending at an angle relative to the first portion; and the second portion is configured to attach to a portion of a side-impact protection component.

16. The vehicle of claim 13, wherein:

each of the first connector bracket and the second connector bracket comprises a first arm extending in the longitudinal orientation of the vehicle and a second arm extending in a transverse orientation of the vehicle;

the first arm attaches to an upper flange of the inboard bracket; and the second arm attaches to a top portion of a respective side bracket.

17. The vehicle of claim 12, wherein the mounting assembly further comprises an end bracket.

18. The vehicle of claim 17, wherein the end bracket comprises a charging-port interface configured to connect to a charging port.

19. The vehicle of claim 12, wherein the mounting assembly further comprises a hoist bracket comprising an aperture configured to receive a portion of a lifting apparatus.

20. The vehicle of claim 12, wherein:

the power supply module is a first power supply module and the mounting assembly is a first mounting assembly; and the vehicle further comprises:

a second power supply module that is positioned beneath the chassis rail and substantially parallel to the first power supply module, with a longitudinal orientation of the second power supply module being substantially perpendicular to the longitudinal orientation of the vehicle; and a second mounting assembly configured to couple the second power supply module to the chassis rail by way of a third overhang and a fourth overhang of the second power supply module, the third overhang positioned along a forward side of the second power supply oriented towards the front of the vehicle and the fourth overhang positioned along a rearward side of the second power supply module oriented toward the rear of the vehicle.

21. The vehicle of claim 12, wherein:

the vehicle further comprises a power component electrically connected to at least one of the first power supply module or the second power supply module; and the first mounting assembly and/or the second mounting assembly comprises at least one cutout configured to receive at least a portion of the power component.

22. A mounting assembly configured to attach a power supply module to beneath a vehicle chassis rail, the mounting assembly comprising:

a first rail-mount bracket and a second rail-mount bracket that are attachable to an outer face of the vehicle chassis rail;

a first vibration damper that is attachable to the first rail-mount bracket;

a second vibration damper that is attachable to the second rail-mount bracket;

a first side bracket that is attachable to a first overhang of the power supply module;

a second side bracket that is attachable to a second overhang of the power supply module;

an inboard bracket attachable to a top portion of the power supply module;

a first connector bracket attachable to the first vibration damper, the first side bracket, and the inboard bracket; and a second connector bracket attachable to the second vibration damper, the second side bracket, and the inboard bracket.

23. The mounting assembly of claim 22, wherein:

the rail-mount bracket comprises a first portion configured to attach to the chassis rail and a second portion extending at an angle relative to the first portion;

the first vibration damper is attachable to the first portion of the rail-mount bracket; and the second portion of the rail-mount bracket is attachable to an impact-protection support member.

24. The mounting assembly of claim 22 further comprising:

a third rail-mount bracket and a fourth rail-mount bracket that are attachable to an outer face of the a second chassis rail;

a third vibration damper that is attachable to the third rail-mount bracket;

a fourth vibration damper that is attachable to the fourth rail-mount bracket;

a third side bracket that is attachable to a third overhang of the power supply module;

a fourth side bracket that is attachable to a fourth overhang of the power supply module;

an second inboard bracket attachable to the top portion of the power supply module;

a third connector bracket attachable to the third vibration damper, the third side bracket, and the second inboard bracket; and a fourth connector bracket attachable to the fourth vibration damper, the fourth side bracket, and the second inboard bracket.

* * * * *